(12) United States Patent
Mullen et al.

(10) Patent No.: US 11,501,217 B2
(45) Date of Patent: Nov. 15, 2022

(54) SYSTEMS AND METHODS FOR A MOBILE ELECTRONIC WALLET

(75) Inventors: Jeffrey D. Mullen, Pittsburgh, PA (US); Christopher J. Rigatti, Pittsburgh, PA (US); Michael T. Wallace, Payson, AZ (US)

(73) Assignee: DYNAMICS INC., Pittsburgh, PA (US)

(*) Notice: Subject to any disclaimer, the term of this patent is extended or adjusted under 35 U.S.C. 154(b) by 0 days.

(21) Appl. No.: 13/468,518

(22) Filed: May 10, 2012

(65) Prior Publication Data

US 2012/0290449 A1 Nov. 15, 2012

Related U.S. Application Data

(60) Provisional application No. 61/484,547, filed on May 10, 2011, provisional application No. 61/484,588, (Continued)

(51) Int. Cl.
 *G06Q 20/00* (2012.01)
 *G06Q 10/00* (2012.01)
 (Continued)

(52) U.S. Cl.
 CPC ........... *G06Q 10/00* (2013.01); *G06Q 20/223* (2013.01); *G06Q 20/322* (2013.01); (Continued)

(58) Field of Classification Search
 CPC ........... G06Q 2220/00; G06Q 2220/10; G06Q 2220/16; G06Q 10/00; G06Q 40/00; (Continued)

(56) References Cited

U.S. PATENT DOCUMENTS 4,353,064 A 10/1982 Stamm
4,394,654 A 7/1983 Hofmann-Cerfontaine
(Continued)

FOREIGN PATENT DOCUMENTS

DE 10 2008 060513 6/2010
JP 05210770 A 8/1993
(Continued)

OTHER PUBLICATIONS

U.S. Appl. No. 60/594,300, Poidomani et al.
(Continued)

*Primary Examiner* — Dante Ravetti
(74) *Attorney, Agent, or Firm* — Andrew Veter

(57) ABSTRACT

Physical cards may be presented to a mobile device to establish a contactless communication channel between the physical card and the mobile device. Information communicated by the physical card may be received, stored, and used by the mobile device to generate a mobile wallet of virtual cards. Each virtual card in a mobile wallet may, for example, look just like its physical counterpart card and may provide equivalent functionality as its physical counterpart card when selected for use by the mobile device. Virtual cards may be sorted within the mobile wallet based on card category (e.g., payment, identification, or gift card category), card attributes (associations with other virtual cards), card variables (e.g., credit limit or credit available), and user attributes and variables (e.g., the user's current location). Information related to a virtual card (e.g., receipts) may be viewed from a display of the mobile device.

18 Claims, 25 Drawing Sheets

Related U.S. Application Data filed on May 10, 2011, provisional application No. 61/484,566, filed on May 10, 2011, provisional application No. 61/484,576, filed on May 10, 2011.

(51) Int. Cl.
*G06Q 40/00* (2012.01)
*G06Q 20/32* (2012.01)
*G06Q 20/22* (2012.01)
*G06Q 20/34* (2012.01)
*G06Q 20/38* (2012.01)

(52) U.S. Cl.
CPC ....... *G06Q 20/3278* (2013.01); *G06Q 20/352* (2013.01); *G06Q 20/385* (2013.01); *G06Q 40/00* (2013.01)

(58) Field of Classification Search
CPC ............. G06Q 20/3278; G06Q 20/223; G06Q 20/352; G06Q 20/322; G06Q 20/385
USPC .................. 705/65, 16, 21, 59; 380/44, 262
See application file for complete search history.

(56) References Cited

U.S. PATENT DOCUMENTS

| | | |
|---|---|---|
| 4,614,861 A | 9/1986 | Pavlov et al. |
| 4,667,087 A | 5/1987 | Quintana |
| 4,701,601 A | 10/1987 | Francini et al. |
| 4,720,860 A | 1/1988 | Weiss |
| 4,786,791 A | 11/1988 | Hodama |
| 4,791,283 A | 12/1988 | Burkhardt |
| 4,797,542 A | 1/1989 | Hara |
| 5,038,251 A | 8/1991 | Sugiyama et al. |
| 5,168,520 A | 12/1992 | Weiss |
| 5,237,614 A | 8/1993 | Weiss |
| 5,276,311 A | 1/1994 | Hennige |
| 5,347,580 A | 9/1994 | Molva et al. |
| 5,361,062 A | 11/1994 | Weiss et al. |
| 5,412,199 A | 5/1995 | Finkelstein et al. |
| 5,434,398 A | 7/1995 | Goldberg |
| 5,434,405 A | 7/1995 | Finkelstein et al. |
| 5,478,994 A | 12/1995 | Rahman |
| 5,479,512 A | 12/1995 | Weiss |
| 5,484,997 A | 1/1996 | Haynes |
| 5,485,519 A | 1/1996 | Weiss |
| 5,585,787 A | 12/1996 | Wallerstein |
| 5,591,949 A | 1/1997 | Bernstein |
| 5,608,203 A | 3/1997 | Finkelstein et al. |
| 5,623,552 A | 4/1997 | Lane |
| 5,657,388 A | 8/1997 | Weiss |
| 5,748,737 A * | 5/1998 | Daggar .......................... 705/41 |
| 5,834,747 A | 11/1998 | Cooper |
| 5,834,756 A | 11/1998 | Gutman et al. |
| 5,856,661 A | 1/1999 | Finkelstein et al. |
| 5,864,623 A | 1/1999 | Messina et al. |
| 5,907,142 A | 5/1999 | Kelsey |
| 5,913,203 A | 6/1999 | Wong et al. |
| 5,937,394 A | 8/1999 | Wong et al. |
| 5,955,021 A | 9/1999 | Tiffany, III |
| 5,956,699 A | 9/1999 | Wong et al. |
| 6,025,054 A | 2/2000 | Tiffany, III |
| 6,045,043 A | 4/2000 | Bashan et al. |
| 6,076,163 A | 6/2000 | Hoffstein et al. |
| 6,085,320 A | 7/2000 | Kaliski |
| 6,095,416 A | 8/2000 | Grant et al. |
| 6,130,621 A | 10/2000 | Weiss |
| 6,145,079 A | 11/2000 | Mitty et al. |
| 6,157,920 A | 12/2000 | Jakobsson et al. |
| 6,161,181 A | 12/2000 | Haynes, III et al. |
| 6,176,430 B1 | 1/2001 | Finkelstein et al. |
| 6,182,894 B1 | 2/2001 | Hackett et al. |
| 6,189,098 B1 | 2/2001 | Kaliski |
| 6,199,052 B1 | 3/2001 | Mitty et al. |
| 6,206,293 B1 | 3/2001 | Gutman et al. |
| 6,240,184 B1 | 5/2001 | Huynh et al. |
| 6,241,153 B1 | 6/2001 | Tiffany, III |
| 6,256,873 B1 | 7/2001 | Tiffany, III |
| 6,269,163 B1 | 7/2001 | Rivest et al. |
| 6,286,022 B1 | 9/2001 | Kaliski et al. |
| 6,308,890 B1 | 10/2001 | Cooper |
| 6,313,724 B1 | 11/2001 | Osterweil |
| 6,353,811 B1 * | 3/2002 | Weissman ....................... 705/40 |
| 6,389,442 B1 | 5/2002 | Yin et al. |
| 6,393,447 B1 | 5/2002 | Jakobsson et al. |
| 6,411,715 B1 | 6/2002 | Liskov et al. |
| 6,446,052 B1 | 9/2002 | Juels |
| 6,460,141 B1 | 10/2002 | Olden |
| 6,592,044 B1 | 7/2003 | Wong et al. |
| 6,607,127 B2 | 8/2003 | Wong |
| 6,609,654 B1 | 8/2003 | Anderson et al. |
| 6,631,849 B2 | 10/2003 | Blossom |
| 6,655,585 B2 | 12/2003 | Shinn |
| 6,681,988 B2 | 1/2004 | Stack et al. |
| 6,705,520 B1 | 3/2004 | Pitroda et al. |
| 6,755,341 B1 | 6/2004 | Wong et al. |
| 6,764,005 B2 | 7/2004 | Cooper |
| 6,769,618 B1 | 8/2004 | Finkelstein |
| 6,805,288 B2 | 10/2004 | Routhenstein et al. |
| 6,811,082 B2 | 11/2004 | Wong |
| 6,813,354 B1 | 11/2004 | Jakobsson et al. |
| 6,817,532 B2 | 11/2004 | Finkelstein |
| 6,873,974 B1 | 3/2005 | Schutzer |
| 6,902,116 B2 | 6/2005 | Finkelstein |
| 6,970,070 B2 | 11/2005 | Juels et al. |
| 6,980,969 B1 | 12/2005 | Tuchler et al. |
| 6,985,583 B1 | 1/2006 | Brainard et al. |
| 6,991,155 B2 | 1/2006 | Burchette, Jr. |
| 7,013,030 B2 | 3/2006 | Wong et al. |
| 7,035,443 B2 | 4/2006 | Wong |
| 7,039,223 B2 | 5/2006 | Wong |
| 7,044,394 B2 | 5/2006 | Brown |
| 7,051,929 B2 | 5/2006 | Li |
| 7,083,094 B2 | 8/2006 | Cooper |
| 7,100,049 B2 | 8/2006 | Gasparini et al. |
| 7,100,821 B2 | 9/2006 | Rasti |
| 7,111,172 B1 | 9/2006 | Duane et al. |
| 7,114,652 B2 | 10/2006 | Moullette et al. |
| 7,136,514 B1 | 11/2006 | Wong |
| 7,140,550 B2 | 11/2006 | Ramachandran |
| 7,163,153 B2 | 1/2007 | Blossom |
| 7,195,154 B2 | 3/2007 | Routhenstein |
| 7,197,639 B1 | 3/2007 | Juels et al. |
| 7,219,368 B2 | 5/2007 | Juels et al. |
| 7,225,537 B2 | 6/2007 | Reed |
| 7,225,994 B2 | 6/2007 | Finkelstein |
| 7,246,752 B2 | 7/2007 | Brown |
| 7,298,243 B2 | 11/2007 | Juels et al. |
| 7,334,732 B2 | 2/2008 | Cooper |
| 7,337,326 B2 | 2/2008 | Palmer et al. |
| 7,346,775 B2 | 3/2008 | Gasparini et al. |
| 7,356,696 B1 | 4/2008 | Jakobsson et al. |
| 7,357,319 B1 | 4/2008 | Lin et al. |
| 7,359,507 B2 | 4/2008 | Kaliski |
| 7,360,688 B1 | 4/2008 | Harris |
| 7,363,494 B2 | 4/2008 | Brainard et al. |
| 7,380,710 B2 | 6/2008 | Brown |
| 7,398,253 B1 | 7/2008 | Pinnell |
| 7,404,087 B2 | 7/2008 | Teunen |
| 7,424,570 B2 | 9/2008 | D'Albore et al. |
| 7,427,033 B1 | 9/2008 | Roskind |
| 7,454,349 B2 | 11/2008 | Teunen et al. |
| 7,461,250 B1 | 12/2008 | Duane et al. |
| 7,461,399 B2 | 12/2008 | Juels et al. |
| 7,472,093 B2 | 12/2008 | Juels |
| 7,472,829 B2 | 1/2009 | Brown |
| 7,483,858 B2 | 1/2009 | Foran et al. |
| 7,494,055 B2 | 2/2009 | Fernandes et al. |
| 7,502,467 B2 | 3/2009 | Brainard et al. |
| 7,502,933 B2 | 3/2009 | Jakobsson et al. |
| 7,503,485 B1 | 3/2009 | Routhenstein |
| 7,516,492 B1 | 4/2009 | Nisbet et al. |
| 7,523,301 B2 | 4/2009 | Nisbet et al. |
| 7,530,495 B2 | 5/2009 | Cooper |

(56) References Cited

U.S. PATENT DOCUMENTS

| | | |
|---|---|---|
| 7,532,104 B2 | 5/2009 | Juels |
| 7,543,739 B2 | 6/2009 | Brown et al. |
| 7,559,464 B2 | 7/2009 | Routhenstein |
| 7,562,221 B2 | 7/2009 | Nystrom et al. |
| 7,562,222 B2 | 7/2009 | Gasparini et al. |
| 7,580,898 B2 | 8/2009 | Brown et al. |
| 7,584,153 B2 | 9/2009 | Brown et al. |
| 7,591,426 B2 | 9/2009 | Osterweil et al. |
| 7,591,427 B2 | 9/2009 | Osterweil |
| 7,602,904 B2 | 10/2009 | Juels et al. |
| 7,631,804 B2 | 12/2009 | Brown |
| 7,639,537 B2 | 12/2009 | Sepe et al. |
| 7,641,124 B2 | 1/2010 | Brown et al. |
| 7,660,902 B2 | 2/2010 | Graham et al. |
| 7,784,687 B2 | 8/2010 | Mullen et al. |
| 7,793,851 B2 | 9/2010 | Mullen |
| 7,828,207 B2 | 11/2010 | Cooper |
| 7,828,220 B2 | 11/2010 | Mullen |
| 7,931,195 B2 | 4/2011 | Mullen |
| 7,954,705 B2 | 6/2011 | Mullen |
| D643,063 S | 8/2011 | Mullen et al. |
| 8,011,577 B2 | 9/2011 | Mullen et al. |
| 8,020,775 B2 | 9/2011 | Mullen et al. |
| 8,066,191 B1 | 11/2011 | Cloutier et al. |
| D651,237 S | 12/2011 | Mullen et al. |
| D651,238 S | 12/2011 | Mullen et al. |
| 8,074,877 B2 | 12/2011 | Mullen et al. |
| D651,644 S | 1/2012 | Mullen et al. |
| D652,075 S | 1/2012 | Mullen et al. |
| D652,076 S | 1/2012 | Mullen et al. |
| D652,448 S | 1/2012 | Mullen et al. |
| D652,449 S | 1/2012 | Mullen et al. |
| D652,450 S | 1/2012 | Mullen et al. |
| D652,867 S | 1/2012 | Mullen et al. |
| D653,288 S | 1/2012 | Mullen et al. |
| 8,172,148 B1 | 5/2012 | Cloutier et al. |
| D665,022 S | 8/2012 | Mullen et al. |
| D665,447 S | 8/2012 | Mullen et al. |
| D666,241 S | 8/2012 | Mullen et al. |
| 8,282,007 B1 | 10/2012 | Cloutier et al. |
| 8,286,876 B2 | 10/2012 | Mullen et al. |
| D670,759 S | 11/2012 | Mullen et al. |
| 8,302,872 B2 | 11/2012 | Mullen |
| D672,389 S | 12/2012 | Mullen et al. |
| 8,322,623 B1 | 12/2012 | Mullen et al. |
| D674,013 S | 1/2013 | Mullen et al. |
| 8,348,172 B1 | 1/2013 | Cloutier et al. |
| 8,382,000 B2 | 2/2013 | Mullen et al. |
| 8,393,545 B1 | 3/2013 | Mullen et al. |
| 8,393,546 B1* | 3/2013 | Yen et al. ............ 235/487 |
| 8,413,892 B2 | 4/2013 | Mullen et al. |
| 8,424,773 B2 | 4/2013 | Mullen et al. |
| 8,459,548 B2 | 6/2013 | Mullen et al. |
| D687,094 S | 7/2013 | Mullen et al. |
| 8,485,437 B2 | 7/2013 | Mullen et al. |
| 8,485,446 B1 | 7/2013 | Mullen et al. |
| 8,511,574 B1 | 8/2013 | Yen et al. |
| 8,517,276 B2 | 8/2013 | Mullen et al. |
| 8,523,059 B1 | 9/2013 | Mullen et al. |
| 8,561,894 B1 | 10/2013 | Mullen et al. |
| 8,567,679 B1 | 10/2013 | Mullen et al. |
| 8,573,503 B1 | 11/2013 | Cloutier et al. |
| 8,579,203 B1 | 11/2013 | Lambeth et al. |
| 8,590,796 B1 | 11/2013 | Cloutier et al. |
| 8,602,312 B2 | 12/2013 | Cloutier et al. |
| 8,608,083 B2 | 12/2013 | Mullen et al. |
| 8,622,309 B1 | 1/2014 | Mullen et al. |
| 8,668,143 B2 | 3/2014 | Mullen et al. |
| 8,727,219 B1 | 5/2014 | Mullen |
| 8,733,638 B2 | 5/2014 | Mullen et al. |
| 8,746,579 B1 | 6/2014 | Cloutier et al. |
| 8,757,483 B1 | 6/2014 | Mullen et al. |
| 8,757,499 B2 | 6/2014 | Cloutier et al. |
| 8,814,050 B1 | 8/2014 | Mullen et al. |
| 8,875,999 B2 | 11/2014 | Mullen et al. |
| 8,881,989 B2 | 11/2014 | Mullen et al. |
| 8,931,703 B1 | 1/2015 | Mullen et al. |
| 8,944,333 B1 | 2/2015 | Mullen et al. |
| 8,973,824 B2 | 3/2015 | Mullen et al. |
| 9,004,368 B2 | 4/2015 | Mullen et al. |
| 9,010,630 B2 | 4/2015 | Mullen et al. |
| 9,053,398 B1 | 6/2015 | Cloutier |
| 9,064,255 B1 | 6/2015 | Mullen et al. |
| 9,292,843 B1 | 3/2016 | Mullen et al. |
| 9,306,666 B1 | 4/2016 | Zhang et al. |
| 9,329,619 B1 | 5/2016 | Cloutier |
| 9,361,569 B2 | 6/2016 | Mullen et al. |
| 9,373,069 B2 | 6/2016 | Cloutier et al. |
| 9,384,438 B2 | 7/2016 | Mullen et al. |
| 9,547,816 B2 | 1/2017 | Mullen et al. |
| 9,639,796 B2 | 5/2017 | Mullen et al. |
| 9,646,240 B1 | 5/2017 | Mullen et al. |
| 9,652,436 B1 | 5/2017 | Yen et al. |
| 9,684,861 B2 | 6/2017 | Mullen et al. |
| D792,511 S | 7/2017 | Mullen et al. |
| D792,512 S | 7/2017 | Mullen et al. |
| D792,513 S | 7/2017 | Mullen et al. |
| 9,697,454 B2 | 7/2017 | Mullen et al. |
| 9,704,088 B2 | 7/2017 | Mullen et al. |
| 9,704,089 B2 | 7/2017 | Mullen et al. |
| 9,721,201 B1 | 8/2017 | Mullen et al. |
| 9,727,813 B2 | 8/2017 | Mullen et al. |
| 9,805,297 B2 | 10/2017 | Mullen et al. |
| 9,818,125 B2 | 11/2017 | Mullen et al. |
| 9,836,680 B1 | 12/2017 | Cloutier |
| 9,852,368 B1 | 12/2017 | Yen et al. |
| 9,875,437 B2 | 1/2018 | Cloutier et al. |
| 9,928,456 B1 | 3/2018 | Cloutier et al. |
| 9,953,255 B2 | 4/2018 | Yen et al. |
| 10,022,884 B1 | 7/2018 | Cloutier |
| 10,032,100 B2 | 7/2018 | Mullen et al. |
| 10,055,614 B1 | 8/2018 | Cloutier et al. |
| 10,095,970 B1 | 10/2018 | Mullen |
| 10,095,974 B1 | 10/2018 | Mullen et al. |
| 10,169,692 B2 | 1/2019 | Mullen et al. |
| 10,176,419 B1 | 1/2019 | Cloutier et al. |
| 10,176,423 B1 | 1/2019 | Mullen et al. |
| 10,181,097 B1 | 1/2019 | Mullen et al. |
| 10,198,687 B2 | 2/2019 | Mullen et al. |
| 10,223,631 B2 | 3/2019 | Mullen et al. |
| 10,255,545 B2 | 4/2019 | Mullen et al. |
| 10,325,199 B2 | 6/2019 | Mullen et al. |
| 10,430,704 B2 | 10/2019 | Mullen et al. |
| 10,467,521 B2 | 11/2019 | Mullen et al. |
| 10,482,363 B1 | 11/2019 | Cloutier et al. |
| 10,496,918 B2 | 12/2019 | Mullen et al. |
| 10,504,105 B2 | 12/2019 | Mullen et al. |
| 10,579,920 B2 | 3/2020 | Mullen et al. |
| 10,693,263 B1 | 6/2020 | Mullen et al. |
| 10,948,964 B1 | 3/2021 | Cloutier |
| 10,997,489 B2 | 5/2021 | Mullen et al. |
| 11,062,195 B2 | 7/2021 | Mullen |
| 11,238,329 B2 | 2/2022 | Mullen et al. |
| 2001/0034702 A1 | 10/2001 | Mockett et al. |
| 2001/0047335 A1 | 11/2001 | Arndt et al. |
| 2001/0049635 A1* | 12/2001 | Chung ............ G06F 17/3089 705/14.73 |
| 2002/0059114 A1 | 5/2002 | Cockrill et al. |
| 2002/0082989 A1 | 6/2002 | Fife et al. |
| 2002/0096570 A1 | 7/2002 | Wong et al. |
| 2002/0120583 A1 | 8/2002 | Keresman, III et al. |
| 2003/0034388 A1 | 2/2003 | Routhenstein et al. |
| 2003/0052168 A1 | 3/2003 | Wong |
| 2003/0057278 A1 | 3/2003 | Wong |
| 2003/0116635 A1 | 6/2003 | Taban |
| 2003/0144956 A1* | 7/2003 | Yu, Jr. ............ G06Q 20/108 705/42 |
| 2003/0152253 A1 | 8/2003 | Wong |
| 2003/0163287 A1 | 8/2003 | Vock et al. |
| 2003/0173409 A1 | 9/2003 | Vogt et al. |
| 2003/0179909 A1 | 9/2003 | Wong et al. |
| 2003/0179910 A1 | 9/2003 | Wong |
| 2003/0226899 A1 | 12/2003 | Finkelstein |
| 2004/0035942 A1 | 2/2004 | Silverman |

(56) References Cited

U.S. PATENT DOCUMENTS

| | | |
|---|---|---|
| 2004/0054574 A1 | 3/2004 | Kaufman et al. |
| 2004/0133787 A1 | 7/2004 | Doughty |
| 2004/0162732 A1 | 8/2004 | Rahim et al. |
| 2004/0172535 A1 | 9/2004 | Jakobsson |
| 2004/0177045 A1 | 9/2004 | Brown |
| 2005/0043997 A1 | 2/2005 | Sohata et al. |
| 2005/0080747 A1 | 4/2005 | Anderson et al. |
| 2005/0086160 A1 | 4/2005 | Wong et al. |
| 2005/0086177 A1 | 4/2005 | Anderson et al. |
| 2005/0116026 A1 | 6/2005 | Burger et al. |
| 2005/0119940 A1 | 6/2005 | Concilio et al. |
| 2005/0154643 A1 | 7/2005 | Doan et al. |
| 2005/0228959 A1 | 10/2005 | D'Albore et al. |
| 2006/0000900 A1 | 1/2006 | Fernandes et al. |
| 2006/0037073 A1 | 2/2006 | Juels et al. |
| 2006/0041759 A1 | 2/2006 | Kaliski et al. |
| 2006/0085328 A1 | 4/2006 | Cohen et al. |
| 2006/0091223 A1 | 5/2006 | Zellner |
| 2006/0161435 A1 | 7/2006 | Atef et al. |
| 2006/0163353 A1 | 7/2006 | Moulette et al. |
| 2006/0174104 A1 | 8/2006 | Crichton et al. |
| 2006/0196931 A1 | 9/2006 | Holtmanns et al. |
| 2006/0256961 A1 | 11/2006 | Brainard et al. |
| 2007/0034700 A1 | 2/2007 | Poidomani et al. |
| 2007/0114274 A1 | 5/2007 | Gibbs et al. |
| 2007/0124321 A1 | 5/2007 | Szydlo |
| 2007/0152070 A1 | 7/2007 | D'Albore |
| 2007/0152072 A1 | 7/2007 | Frallicciardi et al. |
| 2007/0153487 A1 | 7/2007 | Frallicciardi et al. |
| 2007/0174614 A1 | 7/2007 | Duane et al. |
| 2007/0241183 A1 | 10/2007 | Brown et al. |
| 2007/0241201 A1 | 10/2007 | Brown et al. |
| 2007/0256123 A1 | 11/2007 | Duane et al. |
| 2007/0192249 A1 | 12/2007 | Biffle et al. |
| 2007/0291753 A1 | 12/2007 | Romano |
| 2008/0005510 A1 | 1/2008 | Sepe et al. |
| 2008/0008315 A1 | 1/2008 | Fontana et al. |
| 2008/0008322 A1 | 1/2008 | Fontana et al. |
| 2008/0010675 A1 | 1/2008 | Massascusa et al. |
| 2008/0016351 A1 | 1/2008 | Fontana et al. |
| 2008/0019507 A1 | 1/2008 | Fontana et al. |
| 2008/0028447 A1 | 1/2008 | O'Malley et al. |
| 2008/0029607 A1 | 2/2008 | Mullen |
| 2008/0035738 A1 | 2/2008 | Mullen |
| 2008/0040271 A1 | 2/2008 | Hammad et al. |
| 2008/0040276 A1 | 2/2008 | Hammad et al. |
| 2008/0054068 A1 | 3/2008 | Mullen |
| 2008/0054079 A1 | 3/2008 | Mullen |
| 2008/0054081 A1 | 3/2008 | Mullen |
| 2008/0058016 A1 | 3/2008 | Di Maggio et al. |
| 2008/0059379 A1 | 3/2008 | Ramaci et al. |
| 2008/0065555 A1 | 3/2008 | Mullen |
| 2008/0096326 A1 | 4/2008 | Reed |
| 2008/0126398 A1 | 5/2008 | Cimino |
| 2008/0128515 A1 | 6/2008 | Di Iorio |
| 2008/0148394 A1 | 6/2008 | Poidomani et al. |
| 2008/0201264 A1 | 8/2008 | Brown et al. |
| 2008/0209550 A1 | 8/2008 | Di Iorio |
| 2008/0288699 A1 | 11/2008 | Chichierchia |
| 2008/0294930 A1 | 11/2008 | Varone et al. |
| 2008/0302869 A1 | 12/2008 | Mullen |
| 2008/0302876 A1 | 12/2008 | Mullen |
| 2008/0302877 A1 | 12/2008 | Musella et al. |
| 2009/0013122 A1 | 1/2009 | Sepe et al. |
| 2009/0036147 A1 | 2/2009 | Romano |
| 2009/0046522 A1 | 2/2009 | Sepe et al. |
| 2009/0108064 A1 | 4/2009 | Fernandes et al. |
| 2009/0143104 A1* | 6/2009 | Loh .................. G06Q 20/32 455/558 |
| 2009/0150295 A1 | 6/2009 | Hatch et al. |
| 2009/0152365 A1 | 6/2009 | Li et al. |
| 2009/0159663 A1 | 6/2009 | Mullen et al. |
| 2009/0159667 A1 | 6/2009 | Mullen et al. |
| 2009/0159668 A1 | 6/2009 | Mullen et al. |
| 2009/0159669 A1 | 6/2009 | Mullen et al. |
| 2009/0159670 A1 | 6/2009 | Mullen et al. |
| 2009/0159671 A1 | 6/2009 | Mullen et al. |
| 2009/0159672 A1 | 6/2009 | Mullen et al. |
| 2009/0159673 A1 | 6/2009 | Mullen et al. |
| 2009/0159680 A1 | 6/2009 | Mullen et al. |
| 2009/0159681 A1 | 6/2009 | Mullen et al. |
| 2009/0159682 A1 | 6/2009 | Mullen et al. |
| 2009/0159688 A1 | 6/2009 | Mullen et al. |
| 2009/0159689 A1 | 6/2009 | Mullen et al. |
| 2009/0159690 A1 | 6/2009 | Mullen et al. |
| 2009/0159696 A1 | 6/2009 | Mullen |
| 2009/0159697 A1 | 6/2009 | Mullen et al. |
| 2009/0159698 A1 | 6/2009 | Mullen et al. |
| 2009/0159699 A1 | 6/2009 | Mullen et al. |
| 2009/0159700 A1 | 6/2009 | Mullen |
| 2009/0159701 A1 | 6/2009 | Mullen et al. |
| 2009/0159702 A1 | 6/2009 | Mullen |
| 2009/0159703 A1 | 6/2009 | Mullen et al. |
| 2009/0159704 A1 | 6/2009 | Mullen et al. |
| 2009/0159705 A1 | 6/2009 | Mullen et al. |
| 2009/0159706 A1 | 6/2009 | Mullen et al. |
| 2009/0159707 A1 | 6/2009 | Mullen et al. |
| 2009/0159708 A1 | 6/2009 | Mullen et al. |
| 2009/0159709 A1 | 6/2009 | Mullen |
| 2009/0159710 A1 | 6/2009 | Mullen et al. |
| 2009/0159711 A1 | 6/2009 | Mullen et al. |
| 2009/0159712 A1 | 6/2009 | Mullen et al. |
| 2009/0159713 A1 | 6/2009 | Mullen et al. |
| 2009/0160617 A1 | 6/2009 | Mullen et al. |
| 2009/0170432 A1 | 7/2009 | Lortz |
| 2009/0170559 A1* | 7/2009 | Phillips ............... 455/556.1 |
| 2009/0191811 A1 | 7/2009 | Griffin et al. |
| 2009/0210308 A1 | 8/2009 | Toomer et al. |
| 2009/0222383 A1 | 9/2009 | Tato et al. |
| 2009/0242648 A1 | 10/2009 | Di Sirio et al. |
| 2009/0244858 A1 | 10/2009 | Di Sirio et al. |
| 2009/0253460 A1 | 10/2009 | Varone et al. |
| 2009/0255996 A1 | 10/2009 | Brown et al. |
| 2009/0290704 A1 | 11/2009 | Cimino |
| 2009/0303885 A1 | 12/2009 | Longo |
| 2009/0308921 A1 | 12/2009 | Mullen |
| 2010/0020043 A1* | 1/2010 | Park et al. .............. 345/174 |
| 2010/0023449 A1 | 1/2010 | Skowronek et al. |
| 2010/0078472 A1 | 4/2010 | Lin et al. |
| 2010/0082445 A1* | 4/2010 | Hodge ............ G06Q 20/10 705/21 |
| 2010/0153269 A1 | 6/2010 | McCabe |
| 2010/0260388 A1* | 10/2010 | Garrett ............ G06Q 20/22 382/124 |
| 2010/0304670 A1 | 12/2010 | Shuo |
| 2010/0315678 A1* | 12/2010 | Smires et al. ............ 358/1.15 |
| 2011/0028184 A1 | 2/2011 | Cooper |
| 2011/0066550 A1 | 3/2011 | Clinton et al. |
| 2011/0140841 A1* | 6/2011 | Bona ............ G06K 19/06187 340/5.83 |
| 2011/0272465 A1 | 11/2011 | Mullen et al. |
| 2011/0272466 A1 | 11/2011 | Mullen et al. |
| 2011/0272467 A1 | 11/2011 | Mullen et al. |
| 2011/0272471 A1 | 11/2011 | Mullen |
| 2011/0272472 A1 | 11/2011 | Mullen |
| 2011/0272473 A1 | 11/2011 | Mullen et al. |
| 2011/0272474 A1 | 11/2011 | Mullen et al. |
| 2011/0272475 A1 | 11/2011 | Mullen et al. |
| 2011/0272476 A1 | 11/2011 | Mullen et al. |
| 2011/0272477 A1 | 11/2011 | Mullen et al. |
| 2011/0272478 A1 | 11/2011 | Mullen |
| 2011/0272479 A1 | 11/2011 | Mullen |
| 2011/0272480 A1 | 11/2011 | Mullen et al. |
| 2011/0272481 A1 | 11/2011 | Mullen et al. |
| 2011/0272482 A1 | 11/2011 | Mullen et al. |
| 2011/0272483 A1 | 11/2011 | Mullen et al. |
| 2011/0272484 A1 | 11/2011 | Mullen et al. |
| 2011/0276380 A1 | 11/2011 | Mullen et al. |
| 2011/0276381 A1 | 11/2011 | Mullen et al. |
| 2011/0276416 A1 | 11/2011 | Mullen et al. |
| 2011/0276424 A1 | 11/2011 | Mullen |
| 2011/0276425 A1 | 11/2011 | Mullen |
| 2011/0276436 A1 | 11/2011 | Mullen et al. |
| 2011/0276437 A1 | 11/2011 | Mullen et al. |

(56) References Cited

U.S. PATENT DOCUMENTS

| | | |
|---|---|---|
| 2011/0278364 A1 | 11/2011 | Mullen et al. |
| 2011/0282753 A1 | 11/2011 | Mullen et al. |
| 2011/0284632 A1 | 11/2011 | Mullen et al. |
| 2011/0284640 A1 | 11/2011 | Mullen et al. |
| 2012/0028702 A1 | 2/2012 | Mullen et al. |
| 2012/0037709 A1 | 2/2012 | Cloutier et al. |
| 2012/0191612 A1* | 7/2012 | Spodak et al. .................. 705/65 |
| 2012/0197708 A1 | 8/2012 | Mullen et al. |
| 2012/0209744 A1 | 8/2012 | Mullen et al. |
| 2012/0254037 A1 | 10/2012 | Mullen |
| 2012/0286037 A1 | 11/2012 | Mullen et al. |
| 2012/0286928 A1 | 11/2012 | Mullen et al. |
| 2012/0286936 A1 | 11/2012 | Mullen et al. |
| 2012/0318871 A1 | 12/2012 | Mullen et al. |
| 2012/0326013 A1 | 12/2012 | Cloutier et al. |
| 2013/0020396 A1 | 1/2013 | Mullen et al. |
| 2013/0221092 A1* | 8/2013 | Kushevsky .......... G06Q 20/227 235/379 |
| 2013/0282573 A1 | 10/2013 | Mullen et al. |
| 2013/0282575 A1 | 10/2013 | Mullen et al. |
| 2014/0054384 A1 | 2/2014 | Cloutier et al. |
| 2015/0186766 A1 | 7/2015 | Mullen et al. |
| 2016/0162713 A1 | 6/2016 | Cloutier et al. |
| 2016/0180209 A1 | 6/2016 | Mullen et al. |
| 2016/0239735 A1 | 8/2016 | Mullen et al. |
| 2016/0283837 A1 | 9/2016 | Mullen et al. |
| 2016/0307085 A1 | 10/2016 | Mullen et al. |
| 2016/0335529 A1 | 11/2016 | Mullen et al. |
| 2016/0342876 A1 | 11/2016 | Mullen et al. |
| 2016/0342877 A1 | 11/2016 | Mullen et al. |
| 2016/0342878 A1 | 11/2016 | Mullen et al. |
| 2016/0342879 A1 | 11/2016 | Mullen et al. |
| 2016/0342880 A1 | 11/2016 | Mullen et al. |
| 2017/0286817 A1 | 10/2017 | Mullen et al. |
| 2017/0300796 A1 | 10/2017 | Mullen et al. |
| 2018/0053079 A1 | 2/2018 | Cloutier et al. |
| 2018/0060881 A1 | 3/2018 | Mullen et al. |
| 2019/0042903 A1 | 2/2019 | Cloutier et al. |
| 2019/0065928 A1 | 2/2019 | Mullen et al. |
| 2019/0197387 A1 | 6/2019 | Mullen et al. |
| 2019/0340484 A1 | 11/2019 | Mullen et al. |
| 2020/0082383 A1 | 3/2020 | Mullen et al. |

FOREIGN PATENT DOCUMENTS

| | | |
|---|---|---|
| WO | WO9852735 | 11/1998 |
| WO | WO0247019 | 6/2002 |
| WO | WO04012352 | 2/2004 |
| WO | WO06066322 | 6/2006 |
| WO | WO06080929 | 8/2006 |
| WO | WO06105092 | 10/2006 |
| WO | WO06116772 | 11/2006 |
| WO | WO08064403 | 6/2008 |
| WO | WO06078910 | 9/2009 |

OTHER PUBLICATIONS

U.S. Appl. No. 60/675,388, Poidomani et al.
The Bank Credit Card Business. Second Edition, American Bankers Association, Washington, D.C., 1996.
A Day in the Life of a Flux Reversal. http://www.phrack/org/issues.html?issue=37&id=6#article. As viewed on Apr. 12, 2010.
Dynamic Virtual Credit Card Numbers. http://homes.cerias.purdue.edu/~jtli/paper/fc07.pdf. As viewed on Apr. 12, 2010.
English translation of JP 05210770 A.
USPTO, International Search Report, dated Oct. 16, 2012.
EPO, Partial Supplementary Search Report, App No. 12783038.8, dated Nov. 19, 2014.
EPO Search Report App No. 12783038.8, dated Mar. 17, 2015.

* cited by examiner

2200

MOBILE WALLET

You have selected to pay with credit.

Total Purchase  $25.00

Would you like to split the payment?

● YES
○ NO

CREDIT ~2204
$5.00

DEBIT ~2206
$5.00

POINTS ~2208
1500

← BACK

NEXT →

MOBILE WALLET

Credit Offer

[Card image 2304: NATIONAL BANK, 1234567890123456, VISA, Jeffrey D. Mullen]

Would you like to take advantage of a credit offer to replace this card? — 2306

New Card Offer – Bank of America M/C No Annual Fee — 2308

○ YES and automatically cancel VISA 3456
○ YES, but keep VISA 3456
○ YES, but keep VISA 3456 and transfer balance to new card
○ NO thanks

← BACK    NEXT →

FIG. 23

SYSTEMS AND METHODS FOR A MOBILE ELECTRONIC WALLET

CROSS-REFERENCE TO RELATED APPLICATION

This application claims the benefit of U.S. Provisional Patent Application Nos. 61/484,547, titled "SYSTEMS AND DEVICES FOR MOBILE PAYMENT ACCEPTANCE," filed May 10, 2011, 61/484,566, titled "SYSTEMS AND METHODS FOR A MOBILE ELECTRONIC WALLET," filed May 10, 2011, 61/484,576, titled "SYSTEMS AND METHODS FOR MOBILE AUTHORIZATIONS," filed May 10, 2011, and 61/484,588, titled "SYSTEMS AND METHODS FOR CONTACTLESS COMMUNICATION MECHANISMS FOR CARDS AND MOBILE DEVICES," filed May 10, 2011 all of which are hereby incorporated by reference herein in their entirety.

BACKGROUND OF THE INVENTION

This invention relates to mobile devices and related systems.

SUMMARY OF THE INVENTION

A user may communicate information directly from a card to a memory location of a mobile device via a contactless communication channel between the card and the mobile device. Accordingly, for example, a mobile device may store information (e.g., payment information) associated with one or more cards (e.g., one or more payment cards) that have been presented within a proximity to the mobile device. In so doing, for example, a mobile device may be a mobile wallet having multiple accounts (e.g., payment, identification, and travel accounts) stored within a memory of the mobile wallet where each account may be recalled from a memory of the mobile wallet at the user's request to perform a function (e.g., to complete a payment transaction).

A mobile device may detect the presence of a card that is brought within a communication distance of a contactless interface of the mobile device. A card may, for example, provide RFID capability that may communicate with an RFID device of a mobile device when the card comes within a communication distance of the mobile device. Accordingly, for example, a card type may be identified by the mobile device and information associated with the card type may be communicated from the card to the mobile device. Information received by the mobile device from the card may be autonomously categorized by the mobile device in accordance with a card type and the information may be stored and displayed to a user in accordance with the categorization.

A card (e.g., a non-powered payment card) may, for example, communicate one, two, and/or three tracks of magnetic stripe data to a mobile device via a contactless interface. Accordingly, for example, a processor of a mobile device may identify a card type (e.g., a payment card) by analyzing the magnetic stripe data received from the card. A processor of a mobile device may, for example, determine an account type (e.g., credit or debit) that may be associated with the non-powered payment card by inspection of magnetic stripe data (e.g., account number) received from the non-powered card.

A powered card may, for example, communicate information to a contactless interface of a mobile device. In so doing, for example, additional information (e.g., information presented in discretionary data) may be identified by a processor of the mobile device to determine that a detected card is a powered card having increased capability. Accordingly, for example, a user of a powered card may select a feature (e.g., pay with credit) on the powered card and a processor of a mobile device may detect that such a feature is selected based upon an analysis of the information received from the powered card.

A mobile device may, for example, validate a payment card. For example, a mobile device may request entry of a PIN after a payment card is presented to the mobile device. Once a PIN is entered, a mobile device may, for example, access a server associated with the issuing entity to validate the PIN. A processor of a mobile device may, for example, compare the PIN entry against memory contents of the mobile device to locally validate the entered PIN.

Data received from a card may, for example, be encrypted. Accordingly, for example, data received from a card may be stored in an encrypted state and decrypted upon receipt of a decryption key. A decryption key may, for example, be received from a sponsoring entity of the card (e.g., a card issuer's server). Decrypted data may, for example, be destroyed such that each usage of encrypted data may require a decryption key prior to usage. Alternately, for example, decrypted data may be stored within a protected memory of the mobile device and kept for future use.

A user of a mobile device may, for example, extract physical, or real, cards (e.g., payment, identification, travel, and rewards cards) from the user's physical wallet or purse and may convert each physical card into a virtual equivalent card that resides electronically within the mobile device. Accordingly, for example, each physical card (e.g., a powered card or a non-powered card) may be brought within a proximate, or touching, relationship with a mobile device to create a contactless communication channel. Card information (e.g., cardholder data, card data, and card configuration data) may, for example, be communicated by the card to the mobile device via such a contactless communication channel. In so doing, for example, a virtual card may be created within the mobile device that is both visibly and functionally equivalent to its physical counterpart.

A non-powered card may, for example, be virtually rendered onto a display of a mobile device in a manner that resembles its physical counterpart. Card and cardholder information may, for example, be communicated by the non-powered card to the mobile device and rendered onto a virtual card that may be displayed by a processor of the mobile device. Accordingly, for example, the functionality of the physical card (e.g., a non-powered payment card) may be imparted to the virtual card by the mobile device when the mobile device communicates information (e.g., payment information) that may be associated with the non-powered payment card. As per one example, a mobile device may communicate payment information associated with a virtual card that may be displayed on a GUI of the mobile device when the mobile device is brought within a communication distance of a merchant terminal to complete a purchase transaction (e.g., an RFID device of the mobile device may communicate with an RFID device of a merchant terminal to exchange payment information between the mobile device and the merchant terminal to complete the purchase transaction). As per another example, a mobile device may communicate payment information associated with a virtual card when the mobile device accesses a network entity (e.g., a payment server) via a wireless network (e.g., a cellular network or a Wi-Fi hotspot) to complete a purchase transaction using the communicated payment information.

A powered card may, for example, be virtually rendered onto a display of a mobile device in a manner that resembles its physical counterpart. A powered card may, for example, be virtually rendered onto a display of a mobile device in a manner that provides user interface functionality that may be associated with the physical counterpart. A powered card may, for example, communicate configuration information (e.g., button placement and associated functionality, display placement and associated functionality and input/output functionality) to a processor of a mobile device and the processor may render such a configuration onto a virtual card such that the configuration of the virtual card provides substantially identical functionality as compared to its physical counterpart.

As per one example, a powered card (e.g., a powered payment card) may include one or more buttons that when activated determine a method of payment to be used to complete a transaction (e.g., pressing one button may invoke a credit payment transaction while pressing another button may invoke a debit payment transaction). Accordingly, for example, a virtual card may be rendered onto a display of a mobile device that includes the same functionality, such that when one virtual button is touched on the virtual card, a credit payment message is communicated by the mobile device and when another virtual button is touched on the virtual card, a debit payment message is communicated by the mobile device.

As per another example, a powered card may be programmed for a particular feature by pressing a button on the powered card associated with that feature. Accordingly, for example, a powered card may communicate information associated with a selected feature to a mobile device and a processor of the mobile device may render a virtual card on a GUI of the mobile device in accordance with the selected feature. In so doing, for example, a powered card may be selected as a powered payment card with a debit feature and the selected feature may be communicated to a mobile device (e.g., the debit feature may be communicated to a mobile device within a discretionary data field of a magnetic stripe message). The resulting virtual payment card rendered onto a display of the mobile device may, for example, provide a virtual payment card having a fixed payment feature (e.g., a fixed debit payment feature).

A mobile device may, for example, challenge a user of the mobile device to enter a password (e.g., a PIN) that may be associated with a card. A mobile device may, for example, require a password before a virtual card may be created and stored within the mobile device. A mobile device may, for example, allow a virtual card to be created and stored within a mobile device, but may challenge a user of the mobile device to enter a password associated with the virtual card before it can be recalled from a memory of the mobile device and used (e.g., used to complete a purchase transaction).

A user may, for example, participate in the personalization of a virtual card that may be stored within a memory of a mobile device. A mobile device may, for example, store various logos (e.g., issuer logos, network brand logos, and merchant logos) within a memory of the mobile device and may allow a user of the mobile device to use a GUI of the mobile device to personalize an appearance of a virtual card with such logos. Accordingly, for example, a user may perform drag-and-drop operations, alphanumeric entry operations, and any other operation to personalize an appearance of a virtual card stored within a memory of the mobile device.

A processor of a mobile device may, for example, organize two or more virtual cards for display on a GUI of the mobile device. A mobile device may, for example, keep track of a number of usages of one or more virtual cards and may sort such virtual cards within a list of displayed virtual cards so that a user may easily access his or her most used virtual card from a top of the displayed list. A mobile device may, for example, track a location of a user of the mobile device and organize a list of virtual cards in accordance with such a location. Accordingly, for example, a user may be shopping within a general merchandise store (e.g., Target), a processor of the user's mobile device may track the user's position to the Target store and the processor of the user's mobile device may display a virtual card (e.g., a Target gift card) at the top of a displayed list of virtual cards based upon the user's location. In so doing, for example, a virtual card most pertinent to the user's location may be sorted to the top of a displayed list of virtual cards for easy and convenient access by the user.

A user may, for example, select one virtual card from a list of virtual cards presented by a GUI of a mobile device and may perform one of many operations on the selected virtual card. A user may, for example, conduct a purchase transaction using a virtual payment card selected from a list of virtual cards.

Accordingly, for example, a user may place a mobile device within a vicinity of a merchant terminal and may communicate payment information associated with a selected payment card to the merchant terminal. As per another example, payment information associated with a selected virtual card may be communicated to a network entity (e.g., a payment server or an issuer's server) by the mobile device to complete a purchase transaction.

A mobile device may, for example, receive an electronic receipt for the purchase transaction either via a communication channel established between the mobile device and the merchant terminal or via other communication channels (e.g., text messaging or email exchange with a network entity such as a payment server). A user may, for example, view documents (e.g., receipts or bank statements) that may be associated with a virtual card. Accordingly, for example, a mobile device may collect and store documents associated with a virtual payment card and may display the associated documents upon request from the user. A GUI of a mobile device may, for example, allow a user to annotate documents that may be associated with a virtual card (e.g., a user may make a note that may be electronically attached to an electronic receipt that may be associated with a virtual payment card).

Other cards (e.g., other virtual cards) may be associated with a selected virtual card and those associations may be viewed from a GUI of the mobile device. For example, a payment card may be associated with a rewards card, such that in response to a request from a user of a mobile device, a processor of the mobile device may display the associations to the payment card and may use the associated virtual cards in support of a purchase transaction (e.g., the associated rewards card may be used during a payment transaction conducted with the selected virtual payment card so that the rewards account may accrue rewards points for the purchase transaction).

A mobile device may, for example, allow a user of the mobile device to cancel an account that may be associated with a virtual card stored within the mobile device. Accordingly, for example, a virtual payment card may be stored within a mobile device and may be associated with a payment account that is administered by an issuing entity of the payment account. A mobile device may, for example, communicate with such an issuing entity to cancel a payment account that may be associated with a virtual payment card stored within the mobile device. A mobile device may, for example, negotiate with other issuing entities to determine when new payment card offers may be available and to allow a user of the mobile device to accept such payment card offers. Once accepted, a user of a mobile device may conduct other transactions with the newly accepted payment card offers (e.g., account balance(s) associated with existing virtual cards may be transferred to the newly accepted payment card via a request made by the mobile device and an issuing server).

Any mobile device, such as a laptop computer, a mobile telephonic device (e.g., a cellular phone), a PDA, an MP3 player, or a positioning device (e.g., a GPS) may be a mobile wallet. Accordingly, for example, a mobile device may accept payment and other information from any payment card, store and display such information as a virtual card on a GUI of the mobile device, communicate such payment information via a wired and/or a wireless network, complete a settlement process with network entities (e.g., an issuer or a payment server) on such a network, and provide results (e.g., an electronic receipt) of the completed purchase transaction to a display of the mobile device.

A mobile device may include a contactless communication device. Accordingly, for example, a mobile device may communicate with any card having contactless communication capability. For example, a card (e.g., a non-powered card) may include a near-field communication device (e.g., an RFID tag) that may communicate with a contactless communication device of a mobile device to form a two-way communication channel between the card and the mobile device. In so doing, for example, a non-powered card may communicate one, two, and/or three tracks of magnetic stripe information to a mobile device before and/or during a purchase transaction conducted by the mobile device.

A card (e.g., a powered card) may include a near-field communication device (e.g., an RFID) that may communicate with a contactless communication device of a mobile device. A powered card may, for example, include a battery, a processor, memory, and a manual input interface (e.g., one or more buttons) that may allow a user of the powered card to programmably communicate information to a mobile device. For example, a powered payment card may include a feature associated with a button that allows a user to, for example, pay with credit or pay with debit.

Accordingly, for example, a powered payment card may communicate such a payment selection within discretionary data fields of one or more tracks of magnetic stripe data.

A powered card may, for example, include circuitry to simulate touch (e.g., a capacitance change) in order to form a contactless communication channel with a mobile device. Accordingly, for example, a powered card may be pressed against a touch-sensitive display of a mobile device and information may be communicated by the powered card to the mobile device through a series of card-simulated touches that may be detected by the touch-sensitive display of the mobile device and processed by a processor of the mobile device as data communicated by the powered card.

A powered card may, for example, include a light sensor to form a contactless communication channel with a mobile device. Accordingly, for example, a powered card may be pressed against a display of a mobile device and information may be communicated from the mobile device to the powered card through a series of light pulses generated by the display of the mobile device. A frequency, pulse width, and/or a pulse intensity of light pulses may, for example, be detected by a processor of a powered card as data communicated by a mobile device.

A powered card may, for example, include a light source (e.g., an LED) to form a contactless communication channel with a mobile device.

Accordingly, for example, a powered card may emit varying light pulses from an LED that may be detected by a motion-capture device (e.g., a camera) of a mobile device as data communicated by the powered card. A powered card may, for example, include sound emission capabilities that may be detected by a microphone of a mobile device as data communicated by the powered card through a contactless communication channel. A mobile device may, for example, include sound emission capabilities that may be detected by a microphone of a powered card as data communicated by the mobile device through a contactless communication channel.

BRIEF DESCRIPTION OF THE DRAWINGS

The principles and advantages of the present invention can be more clearly understood from the following detailed description considered in conjunction with the following drawings, in which the same reference numerals denote the same structural elements throughout, and in which:

FIG. 22 is an illustration of a display screen constructed in accordance with the principles of the present invention;

FIG. 23 is an illustration of a display screen constructed in accordance with the principles of the present invention;

DETAILED DESCRIPTION OF THE INVENTION

Figure 1:
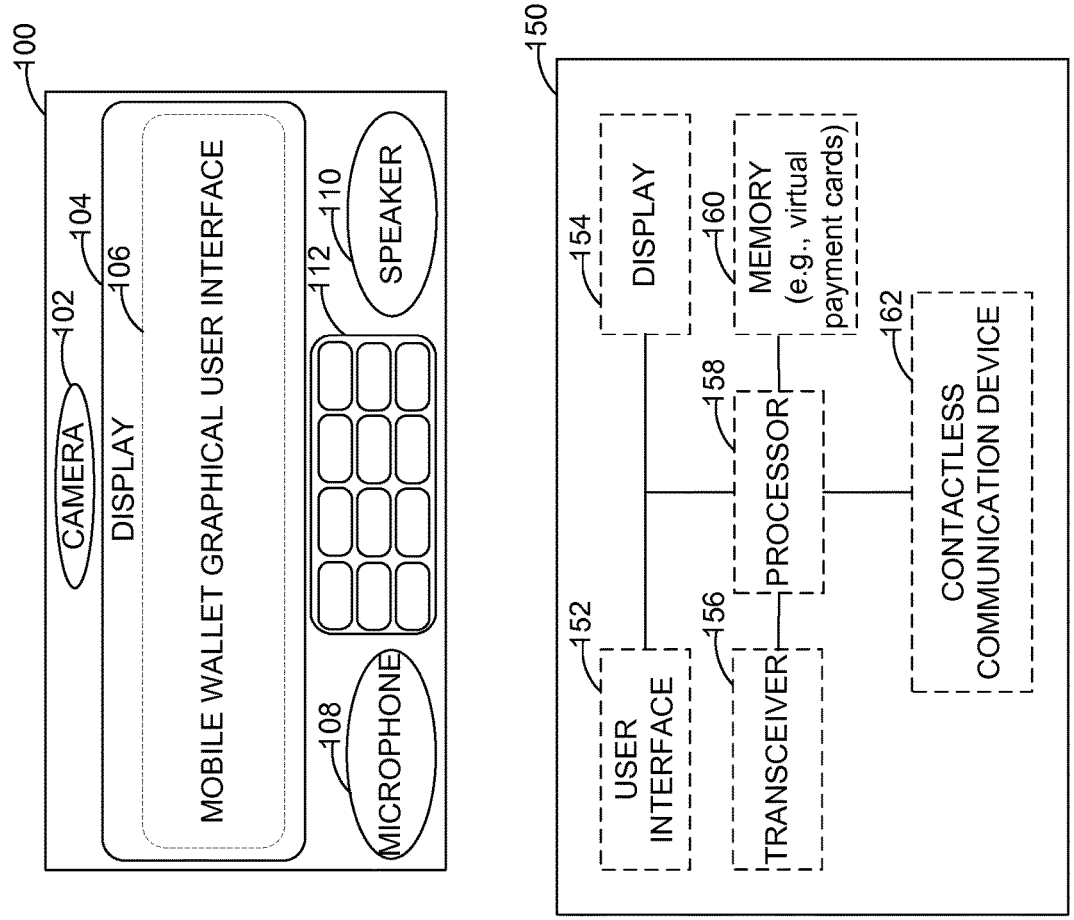
FIG. 1 is an illustration of a mobile devices constructed in accordance with the principles of the present invention.

FIG. 1 shows mobile device 100. Mobile device 100 may be any mobile device, such as a mobile telephonic device (e.g., cell phone), a PDA, an electronic tablet, an MP3 player, or a locating device (e.g., a GPS device). Accordingly, for example, mobile device 100 may be operated in a mobile environment while a user of mobile device 100 goes about his or her daily activities (e.g., driving, shopping, walking, dining, and exercising). In addition, for example, mobile device 100 may perform multiple functions simultaneously (e.g., a person may carry on a conversation while at the same time browsing and purchasing products on the Internet).

Mobile device 100 may include audio processing devices (e.g., microphone 108 and speaker 110). Accordingly, for example, mobile device 100 may receive voice commands from a user via microphone 108 and may process such commands to perform a function. For example, a user may place mobile device 100 into a desired operational mode by speaking a command into microphone 108 that is associated with the desired operational mode. In so doing, for example, mobile device 100 may engage in hands-free operation by receiving voice commands via microphone 108 and performing functions associated with the received voice commands.

Mobile device 100 may receive data input via microphone 108. For example, a voice-band modem may generate signals in a voice-band frequency range that may be received by microphone 108. A processor of mobile device 100 may interpret the received audible information as data signals and may process the data signals as, for example, data values and/or control data input.

Mobile device 100 may include camera 102. Camera 102 may capture one or more frames of video data and store the video data within a memory of mobile device 100. Accordingly, for example, a processor of mobile device 100 may receive one or more frames of video information via camera 102 and may process the video information as data values and/or control data input. In so doing, for example, mobile device 100 may receive optical information that is sensed by camera 102 during a series of one or more video capture events that produce one or more frames of video information. The one or more frames of video information may contain one or more data elements (e.g., pixels) having properties (e.g., color, intensity, or contrast) that may be interpreted by a processor of mobile device 100 as data values and/or control data.

Mobile device 100 may include manual input interface 112. Manual input interface 112 may, for example, include keys and/or buttons that may be sensitive to manual input, such as a touch or an application of pressure. Accordingly, for example, a user of mobile device 100 may enter information into mobile device 100 via manual interface 112 to cause a processor of mobile device 100 to enter a particular mode of operation. Manual interface 112 may, for example, be used for data entry (e.g., dialing a phone number or entering data as may be requested by mobile device 100) during a particular mode of operation of mobile device 100.

Mobile device 100 may include display 104. Display 104 may provide visible information that may be utilized by a user during interaction with mobile device 100. A portion or all of display 104 may be touch sensitive such that objects making contact with display 104 or objects coming within a proximity of display 104 may be detected by a processor of mobile device 100. Accordingly, for example, mobile wallet graphical user interface 106 may be provided by display 104 so that graphical information may be displayed to solicit and/or receive data entry from a user. In so doing, for example, touch-sensitive graphical user interface devices such as radio buttons, textual input boxes, virtual buttons, pull-down menus, and navigational tools may be used for data entry to initiate, change, and/or support functions performed by mobile device 100.

Display 104 may, for example, display graphical objects that may interact with a user of mobile device 100. Accordingly, for example, a virtual card (e.g., a virtual payment card) may be rendered onto display 104 having interactive components associated with such a virtual payment card. In so doing, for example, a virtual payment card displayed by display 104 may itself include a virtual user interface (e.g., one or more virtual buttons) that may be sensitive to touch or proximity. Such virtual buttons may be associated with a feature (e.g., one or more tracks of magnetic stripe information may be communicated by the mobile device when a button is activated). In so doing, for example, a feature activated on a virtual payment card displayed by display 104 may cause mobile device 100 to behave like a payment card (e.g., one or more tracks of magnetic stripe information may be communicated by mobile device 100 when a virtual button of a virtual payment card of display 104 is activated).

FIG. 1 shows architecture 150. User interface 152 may, for example, be included within architecture 150 to allow user interaction with architecture 150. For example, a dedicated key pad or keyboard may be included within user interface 152 to allow alphanumeric data entry into architecture 150.

Architecture 150 may include one or more displays 154. Display 154 may, for example, be touch-sensitive. Accordingly, for example, display 154 may be utilized for alphanumeric data entry using virtual buttons that may be rendered onto touch-sensitive portions of display 154. In so doing, for example, touching virtual buttons that may be associated with alphabetic and numeric characters of display 154 may be detected by processor 158 as alphanumeric data entry.

Alphanumeric entry boxes may, for example, be rendered onto display 154. A user may, for example, activate a cursor within such an alphanumeric entry box by touching an area within the alphanumeric entry box. A user may utilize user interface 152 and/or a virtual keypad rendered onto display 154 to select alphanumeric characters to be placed within the alphanumeric entry box having a character position identified, for example, by an activated cursor within the alphanumeric entry box. In so doing, for example, processor 158 may receive alphanumeric characters as typed into a alphanumeric entry box of display 154 and may use such alphanumeric characters as data input.

Display 154 may, for example, render a virtual representation of a card (e.g., one or more virtual payment cards stored within memory 160). Accordingly, for example, information (e.g., payment card number, cardholder name, bank logos and issuer identification) may be stored within memory 160 and rendered onto display 154 as a virtual representation of a card. In so doing, for example, virtual interactive objects (e.g., buttons, displays, light sources and light sensors) that may be associated with a virtual card on display 154 may be utilized through interaction with display 154 just as if the virtual card were physically present.

Display 154 may, for example, provide data output from architecture 150. For example, display 154 may communicate data using a series of light pulses. Accordingly, for example, processor 158 may cause one or more portions of display 154 to produce light pulses having varying characteristics (e.g., duration, intensity, and frequency) that may communicate information via such light pulses. In so doing, for example, a device that may be sensitive to light pulses may receive information communicated by display 154 via light pulses having varying characteristics. Display 154 may, for example, communicate data using visual information that may be substantially static (e.g., a barcode).

Architecture 150 may include one or more transceivers 156. Transceiver 156 may communicate information to and/or may receive information from one or more devices. Transceiver 156 may, for example, communicate via a wireless interface with one or more cellular stations of a mobile network. Accordingly, for example, transceiver 156 may allow a mobile device (e.g., mobile device 100 of FIG. 1) to establish a communications channel with an associated cellular station. In so doing, for example, a mobile device (e.g., mobile device 100 of FIG. 1) may exchange information (e.g., voice, text, data, or multimedia) with one or more terrestrial networks (e.g., the internet or a payment network) via an associated cellular station. As per another example, transceiver 156 may exchange information with one or more other mobile devices via one or more associated cellular stations.

Transceiver 156 may, for example, communicate via a wireless interface with one or more mobile devices directly. Accordingly, for example, transceiver 156 may communicate with another mobile device without first accessing a mobile network via a cellular station of the mobile network. As per another example, transceiver 156 may, for example, communicate via a wireless interface with one or more network devices (e.g., a wireless access point) directly. Accordingly, for example, a mobile device (e.g., mobile device 100 of FIG. 1) may directly connect to a wired and/or a wireless network via any one or more wireless standards (e.g., Bluetooth or Wi-Fi) to exchange information with other devices that may be connected to the wired and/or wireless network. In so doing, for example, a wired and/or wireless network may be accessed by a mobile device without first accessing a mobile network via a cellular station of a mobile network.

Architecture 150 may include contactless communication device 162, which may communicate via any one or more contactless communication methodologies, such as for example, near field communications (e.g., RFID), Bluetooth, touch simulation, light pulsing (e.g., via an LED), and electromagnetic data communication (e.g., via a dynamic magnetic stripe communications device). Accordingly, for example, contactless communication device 162 may be compatible with any contactless device, such as for example, an RFID enabled payment card and a contactless reader (e.g., a magnetic stripe reader or an NFC reader).

A non-powered card may, for example, communicate with contactless communications device 162. Contactless communication device 162 may, for example, establish a carrier field (e.g., an RF field) that may be modulated by a device (e.g., an RFID tag) of a non-powered payment card. In so doing, for example, an RFID tag of a non-powered payment card may derive operational power from an RF field provided by contactless communications device 162 and may communicate information (e.g., one, two, and/or three tracks of magnetic stripe data) to contactless communication device 162 by modulating the RF field produced by contactless communications device 162.

A powered card may, for example, communicate with contactless communication device 162. A powered card may, for example, include a processor, a battery, a memory, wireless communications devices (e.g., a dynamic magnetic stripe communications device or RFID) and other electronics (e.g., buttons, displays, light sources and light sensors) that may allow a user to interact with the powered card to perform one or more functions. Accordingly, for example, a powered card may be used to communicate specific information to contactless communication device 162 by selective interaction with the buttons of the powered card. In so doing, for example, a powered card may be used to interactively communicate magnetic stripe information (e.g., one, two, and/or three tracks of magnetic stripe data) to contactless communication device 162 by sending a signal to a processor of a powered card (e.g., by pressing a button on the powered card) to initiate such communications.

Contactless communication device 162 may receive variable data sets from a powered card based upon, for example, manual input provided to a powered card. For example, a button associated with an on-line purchase may be pressed on the powered card that causes a variable data set (e.g., account number and expiration date) to be communicated from the powered card to contactless communication device 162.

Discretionary data may, for example, be communicated by a powered card based upon which button was pressed on the powered card. In so doing, for example, a security code (e.g., "111") may be communicated within a discretionary data field when a button associated with a particular feature (e.g., pay with credit) is pressed on the powered card. As per another example, a different security code (e.g., "222") may be communicated within a discretionary data field when a button associated with a different feature (e.g., pay with debit) is pressed on the powered card. Accordingly, for example, processor 158 may identify what type of device may be in communication with contactless communication device 162 by analyzing the data communicated to contactless communication device 162.

Architecture 150 may include memory 160 and/or processor 158 may include internal memory. Accordingly, for example, application code may be stored within memory 160 and/or processor 158 and executed by processor 158 in support of functions performed by architecture 150. For example, an application (e.g., a mobile wallet graphical user interface) may be executed by architecture 150 and displayed onto display 154, which may be used to interact with a user of a mobile device (e.g., mobile device 100 of FIG. 1). Persons skilled in the art will appreciate that executable application code may be communicated to architecture 150 via any one or more interfaces of architecture 150 (e.g., user interface 152, display 154, transceiver 156, and/or contactless communication device 162).

Application data (e.g., virtual payment card data) may be stored within memory 160 and accessed by processor 158 during operation. For example, payment card data may be stored within memory 160 and recalled by processor 158 during a financial transaction being conducted by a mobile device (e.g., mobile device 100 of FIG. 1). Once recalled, processor 158 may communicate the payment card data via transceiver 156 and/or contactless communication device 162 to complete a financial transaction.

Figure 2:
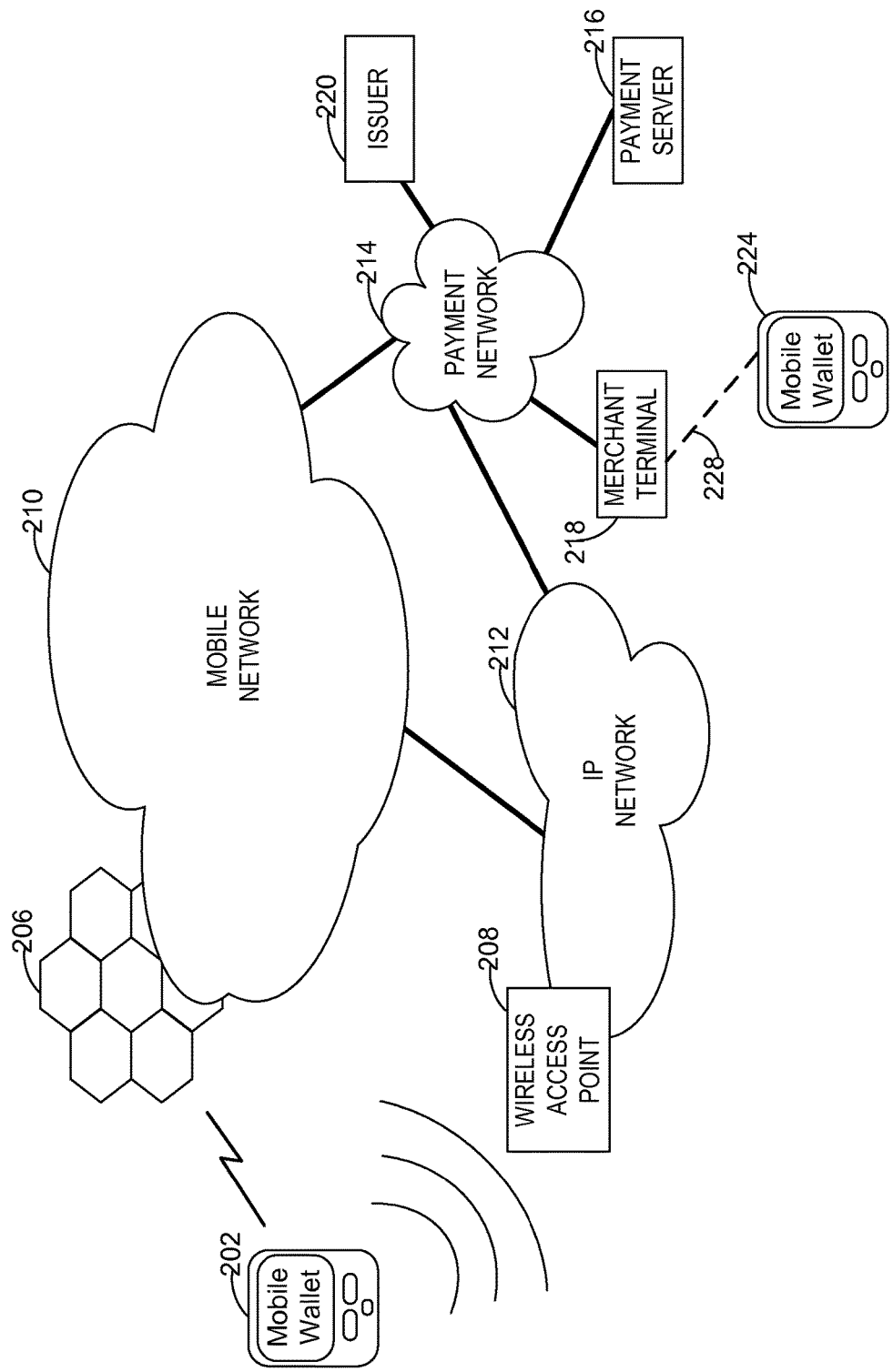
FIG. 2 is an illustration of a network topology constructed in accordance with the principles of the present invention.

FIG. 2 shows network topology 200 that may include, for example, mobile wallet 202 (e.g., a mobile telephonic device, a PDA, an electronic tablet, a laptop, a GPS unit, or an MP3 player). Mobile wallet 202 may, for example, include a contactless interface that may initiate, sustain, and/or terminate a communication channel between a contactless device (e.g., an RFID enabled payment card) and mobile wallet 202. A contactless device and mobile wallet 202 may communicate using any number of contactless mediums, which may include for example, visible, audible, capacitive, electromagnetic, magnetic, and/or RF mediums.

Mobile wallet 202 may provide one or more transceivers that may communicate with one or more wired networks (e.g., IP network 212 and/or payment network 214) and/or one or more wireless networks (e.g., mobile network 210). Mobile wallet 202 may, for example, communicate with a cellular station over a wireless radio interface (e.g., a GSM air interface) that may be used by mobile wallet 202 to communicate information (e.g., voice and data) to cellular network access infrastructure 206 (e.g., one or more GSM base transceiver stations, base station controllers, and mobile switching centers). Persons skilled in the art will appreciate that cellular network access infrastructure 206 may utilize any multiple access architecture, such as for example, a code-division multiple access architecture and/or a time-division multiple access architecture.

Mobile wallet 202 may, for example, communicate with wireless access point 208 over a wireless interface (e.g., a Bluetooth interface or a Wi-Fi interface). Accordingly, for example, mobile wallet 202 may access one or more wired networks (e.g., IP network 212 and/or payment network 214) and/or one or more wireless networks (e.g., mobile network 210) without the need to first gain access to cellular network access infrastructure 206.

Any contactless device (e.g., a powered payment card or a non-powered payment card) may, for example, communicate with mobile wallet 202 via a contactless medium. Accordingly, for example, payment information (e.g., a payment account number and a card expiration date) may be communicated from a contactless device to mobile wallet 202. In so doing, for example, items for purchase on IP network 212 (e.g., the internet) may be accessed by a browser of mobile wallet 202 via an access point (e.g., wireless access point 208 or cellular network access infrastructure 206). Mobile wallet 202 may, for example, complete a purchase transaction by first obtaining required payment information from a contactless device, storing such payment information and communicating such payment information to network entities (e.g., payment server 216 and/or issuer 220).

Payment server 216 may, for example, contact issuer 220 via a network (e.g., payment network 214) with payment information received from mobile wallet 202 for authorization of a purchase. Once authorized, payment transaction information may be recorded onto a receipt that may be delivered to mobile wallet 202 via any one or more delivery options (e.g., via a short messaging service of mobile network 210 or an email delivery service of IP network 212). Mobile wallet 202 may allow a user to associate purchase categories (e.g., groceries, auto repair, or entertainment) to purchases transacted by the mobile wallet so that the user may receive a more detailed accounting of his or her expenditures on his or her receipt. Accordingly, for example, a user may enjoy a higher degree of integration such that a user may customize a level of detail provided on a receipt via mobile wallet 202.

A payment receipt may, for example, be provided to mobile wallet 202 as a proof-of-purchase object (e.g., a barcode) that may be provided to a display of mobile wallet 202 and read by other computing equipment (e.g., a barcode scanner) for proof-of-purchase confirmation.

A mobile wallet (e.g., mobile wallet 224) may, for example, include a contactless communication device (e.g., an RFID) that may initiate, sustain, and/or terminate contactless communication channel 228 with merchant terminal 218. Accordingly, for example, mobile wallet 224 may communicate payment information to merchant terminal 218 to complete a financial transaction. In so doing, for example, mobile wallet 224 may first receive payment information via a contactless communication channel from one or more contactless devices (e.g., a non-powered card), store the received payment information within a memory of mobile wallet 224, and forward the payment information onto merchant terminal 218 to complete a financial transaction. Accordingly, for example, payment information may be recalled from memory within mobile wallet 224, optionally authenticated and authorized by a user of mobile wallet 224 and communicated to merchant terminal 218 via contactless communication channel 228 to complete a financial transaction using merchant terminal 218. An electronic receipt may, for example, be generated by merchant terminal 218 and communicated to mobile wallet 224 via contactless communication channel 228.

Figure 3:
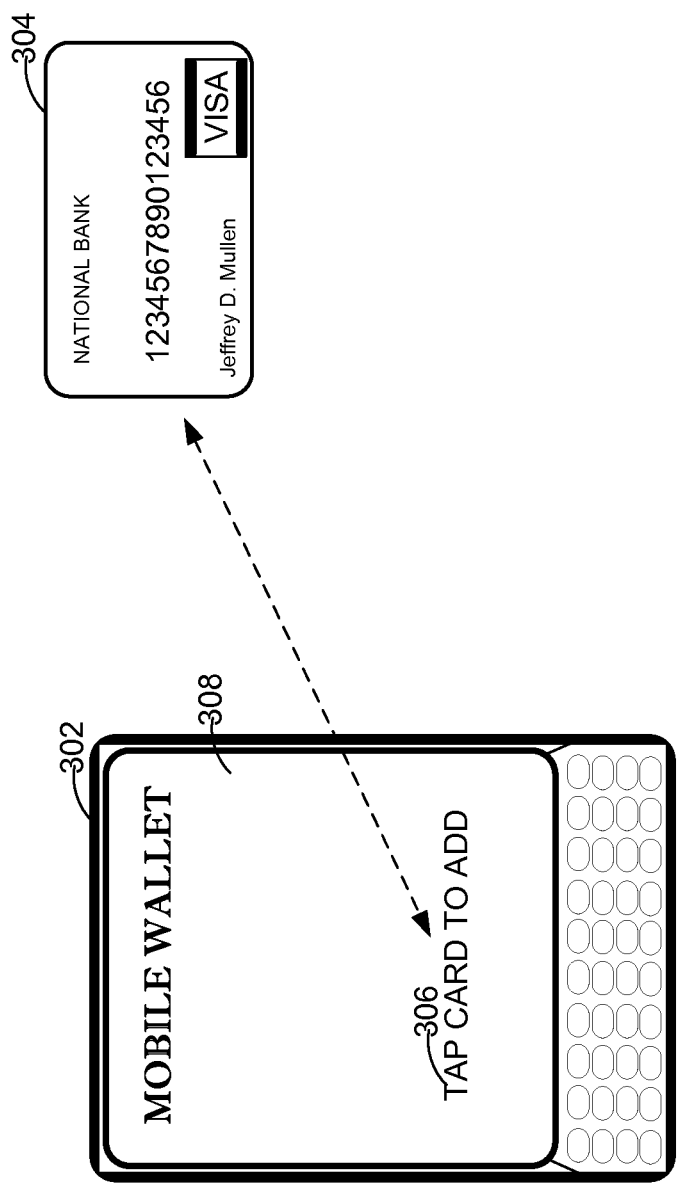
FIG. 3 is an illustration of a mobile wallet system constructed in accordance with the principles of the present invention.

FIG. 3 shows system 300, which may include mobile wallet 302 and payment card 304. Mobile wallet 302 may, for example, be a laptop computer, a PDA, a mobile telephonic device (e.g., a smartphone), an MP3 player, a GPS, or any other mobile device. Display 308 may be a touch-sensitive display (e.g., sensitive to a change in capacitance). Payment card 304 may, for example, be a powered payment card or a non-powered payment card.

Mobile wallet 302 and payment card 304 may each include a contactless communication device (e.g., RFID) that may communicate via a contactless communication channel that may be formed between mobile wallet 302 and payment card 304 after coming into proximity to one another. Payment card 304 may, for example, be tapped onto display 308 of mobile wallet 302 to establish a proximity relationship that forms a communication channel between payment card 304 and mobile wallet 302. As per another example, payment card 304 may be brought within a proximity distance (e.g., up to two inches) of mobile wallet 302 to establish a contactless communication channel between mobile wallet 302 and payment card 304.

A processor of mobile wallet 302 may, for example, execute application code that may generate a graphical user interface (GUI) onto display 308 of mobile wallet 302. Message 306 of such a GUI may invite a user of mobile wallet 302 to begin storage of card information (e.g., payment card information) by tapping one or more cards (e.g., one or more payment cards) against display 308. As per another example, by tapping a card (e.g., payment card 304) against mobile wallet 302, a processor of mobile wallet 302 may autonomously determine that card information associated with the tapped card is to be stored within a memory of mobile wallet 302 and a processor of mobile wallet 302 may then generate a mobile wallet GUI onto display 308 to autonomously download the card information and engage a user of mobile wallet 302 to administer any other activities that may be associated with such an information download.

A processor of mobile wallet 302 may, for example, autonomously determine a type of card that may be tapped against it. For example, a processor of mobile wallet 302 may receive payment card data that may be indicative of a non-powered payment card (e.g., payment card data received from a non-powered card may not provide a security code associated with the card). As per another example, a processor of mobile wallet 302 may receive data that may be indicative of a powered card (e.g., payment card data received may contain a dynamically generated security code). Payment card data received from a powered card may, for example, include a dynamic security code that may change depending upon a type of transaction being conducted (e.g., debit or credit transaction).

As per another example, payment card 304 may be a powered payment card that may include electronics to simulate a human touch (e.g., payment card 304 may generate a change in capacitance that may be sensed by display 308). Through a series of simulated touches, payment card 304 may communicate a series of data bits to display 308, which may then be processed by a processor of mobile wallet 302. In so doing, for example, a contactless communication channel may be established where data is transferred from payment card 304 to mobile wallet 302 via a series of simulated touches.

Payment card 304 may, for example, include a light sensor. Accordingly, for example, payment card 304 may be sensitive to light pulses generated within a region of display 308. The light sensor of payment card 304 may receive a series of light pulses, which may be construed by a processor of payment card 304 as data generated by mobile wallet 302. In so doing, for example, payment card 304 may receive an optical data stream represented by a series of light pulses generated by display 308. As such, a two-way communication channel may be formed, where simulated touches may generate a data stream from payment card 304 to mobile wallet 302 and light pulses may generate a data stream from mobile device 302 to payment card 304.

Figure 4:
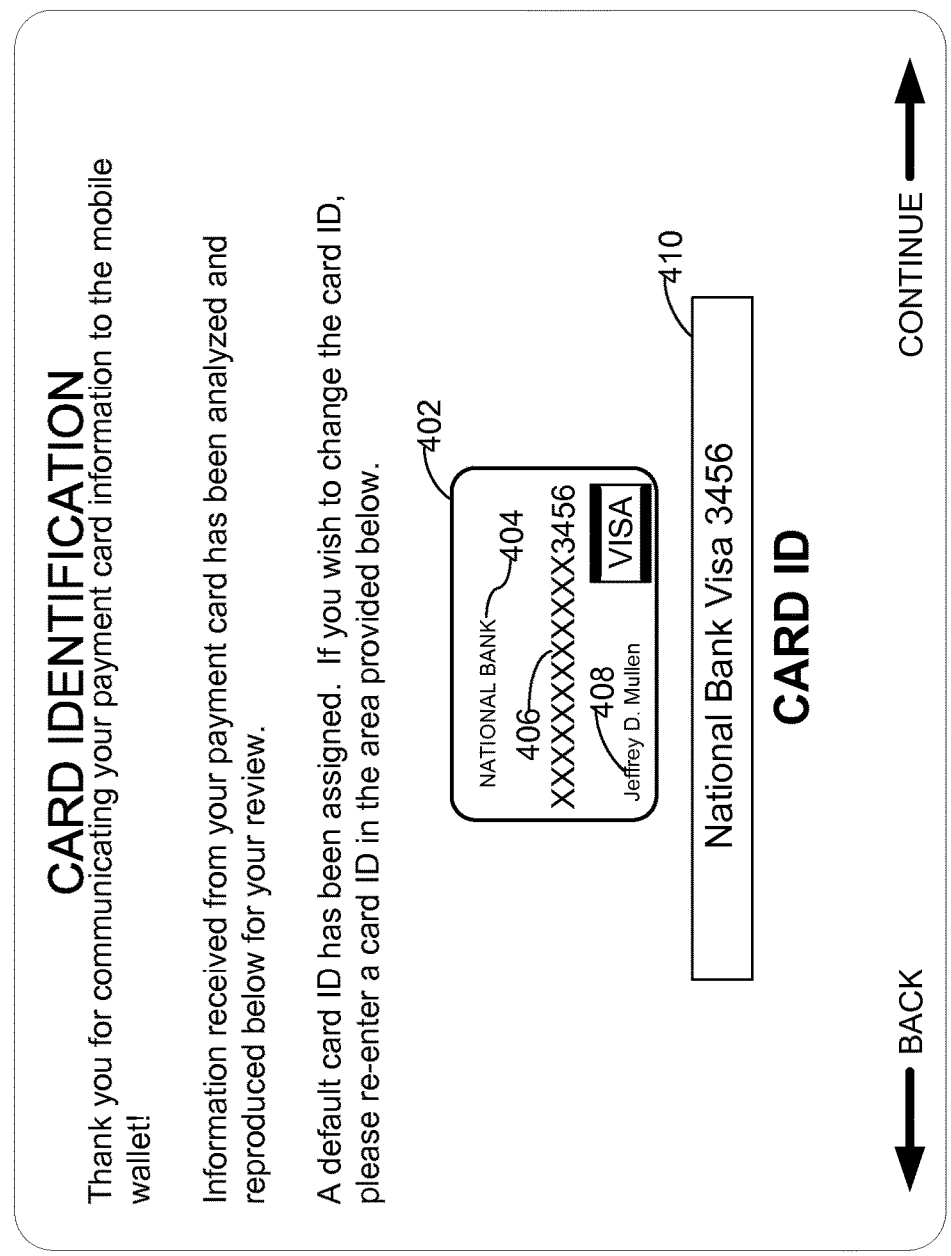
FIG. 4 is an illustration of a display screen constructed in accordance with the principles of the present invention.

FIG. 4 shows GUI 400, that may be generated by a processor of a mobile device and provided onto a display of the mobile device. GUI 400 may, for example, provide a summary information screen that provides virtual card 402 and associated identifying information. Virtual card 402, for example, may be a virtual representation of a physical card that may have been tapped against a display of a mobile device to form a contactless communication channel between the physical card and a mobile device.

Card (e.g., payment card) information (e.g., track 1 and track 2 magnetic stripe data) may be communicated to the mobile device via a contactless communication channel and such information may be displayed within virtual card 402 as summary information that may be associated with the physical payment card. A payment card number communicated to a mobile device within a magnetic stripe message may, for example, include issuer identification as well as an issuing network identifier. Accordingly, for example, a processor of a mobile device may analyze the payment card number received from a physical payment card and may render a portion or all of the identifying information associated with the payment card number onto virtual card 402.

In so doing, for example, issuer identification 404 as well as a logo representative of an issuing network identifier may be rendered onto virtual card 402. Additionally, a portion or all of payment card number 406 as well as cardholder's information (e.g., cardholder's name 408) may be rendered onto virtual card 402.

A portion or all of the card information received from a physical card may be stored within a memory of a mobile device. Alternately, for example, a portion or all of the card information received from a physical card may be collected by a mobile device and communicated by the mobile device to a remote server for storage and/or validation purposes. In so doing, for example, instead of storing payment card information within a memory of a mobile device, card identification 410 may, for example, be stored within a mobile device and used as an index identifier to look up payment information that may be stored within a remote server. A processor of a mobile device may generate card identification 410 and may display card identification 410 within an alphanumeric entry box. In so doing, for example, a user of a mobile device may either accept, or change, card identification 410 to a value that may later be used to remind the user of which physical payment card is associated with card identification 410 and to recall payment information associated with card identification 410 that may be remotely stored.

Figure 5:
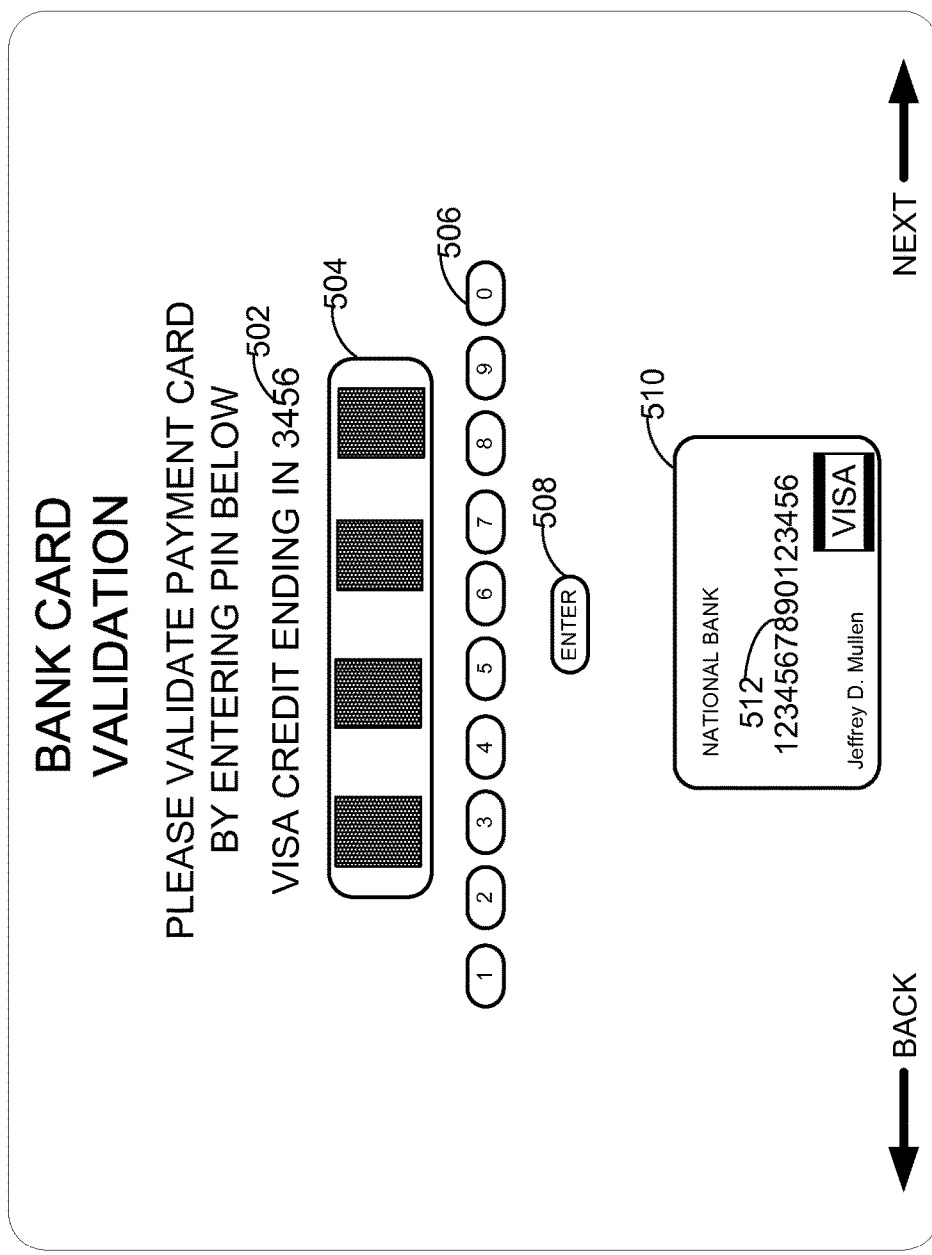
FIG. 5 is an illustration of a display screen constructed in accordance with the principles of the present invention.

FIG. 5 shows GUI 500, that may be generated by a processor of a mobile device and provided onto a display of the mobile device. GUI 500 may, for example, include a bank card validation screen as may be generated by a processor of a mobile device. GUI 500 may, for example, challenge a user of the mobile device to enter a PIN that may be associated with a payment card (e.g., VISA credit 502) that was previously presented to the mobile device so that payment information may be uploaded from the payment card to the mobile device via a contactless communication channel generated between the payment card and the mobile device. GUI 500 may, for example, generate virtual pin pad 506 that may include touch-sensitive buttons having alphanumeric indicia associated with each button. A user may touch one or more buttons of pin pad 506 that may correspond to respective characters of a PIN and an indication of the user's selection may appear within area 504. Characters displayed within area 504 may, for example, be hidden for security purposes.

Activation of virtual button 508 may, for example, cause a processor of a mobile device to compare a PIN entered by a user of the mobile device to a PIN that may be associated with the payment card presented to the mobile device for storage. The PIN may, for example, be stored within protected memory of the mobile device, so that a processor of the mobile device may locally determine the validity of the PIN entered. Alternately, for example, the mobile device may communicate the PIN to, for example, the issuing bank for a remote validation of the PIN entered. Persons skilled in the art will appreciate that a user interface (e.g., a keypad or keyboard) of a mobile device may be used instead of virtual pin pad 506 to enter the one or more characters of a PIN.

Upon validation that the correct PIN was entered, virtual card 510 may be displayed. In particular, for example, account number 512 may be fully populated within virtual card 510 to indicate to a user of the mobile device that the PIN was correctly entered and to allow the user to compare account number 512 against an account number printed on the physical payment card of which virtual card 510 is a representation. Persons skilled in the art will appreciate that virtual payment cards may be stored within a mobile wallet without first requiring a user to validate the payment card using a PIN entry. An alternate form of validation (e.g., a security code) may, for example, be required for validation. As per another example, no validation may be required to store a virtual payment card onto a mobile wallet.

Figure 6:
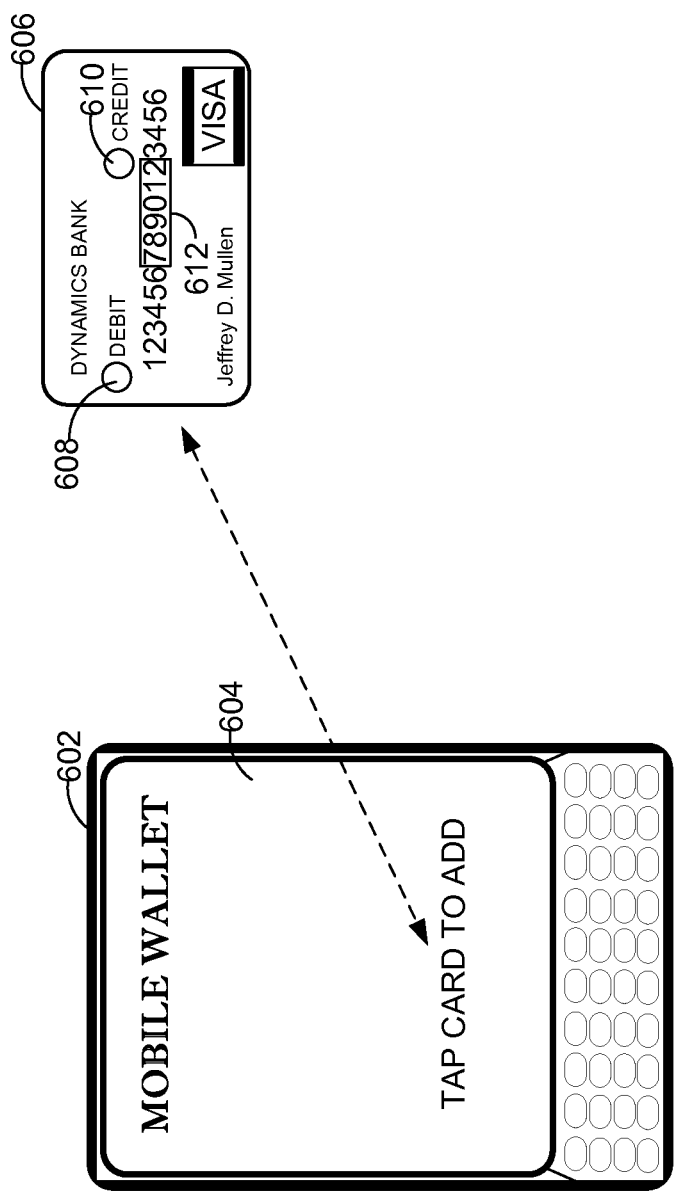
FIG. 6 is an illustration of a mobile wallet system constructed in accordance with the principles of the present invention.

FIG. 6 shows system 600, which may include mobile wallet 602 and card 606. Card 606 may, for example, be a powered card (e.g., a powered payment card). Accordingly, for example, card 606 may include a processor, display 612, a battery, manual input interfaces (e.g., buttons 608 and 610) and other electronic components (e.g., a light source, a light sensor and a touch simulator). A user of powered card 606 may, for example, interact with card 606 to select the information that may be communicated to mobile wallet 602 from card 606.

A user may, for example, press button 608 and then tap card 606 against display 604 of mobile wallet 602 to generate a contactless communication channel (an RFID communication channel) between card 606 and mobile wallet 602. Accordingly, for example, card 606 may communicate payment information (e.g., one, two and/or three tracks of magnetic stripe data) that may be associated with a feature selected by pressing button 608. In so doing, for example, card 606 may communicate information (e.g., within a discretionary data field) associated with a selected feature (e.g., a VISA debit payment feature).

Figure 7:
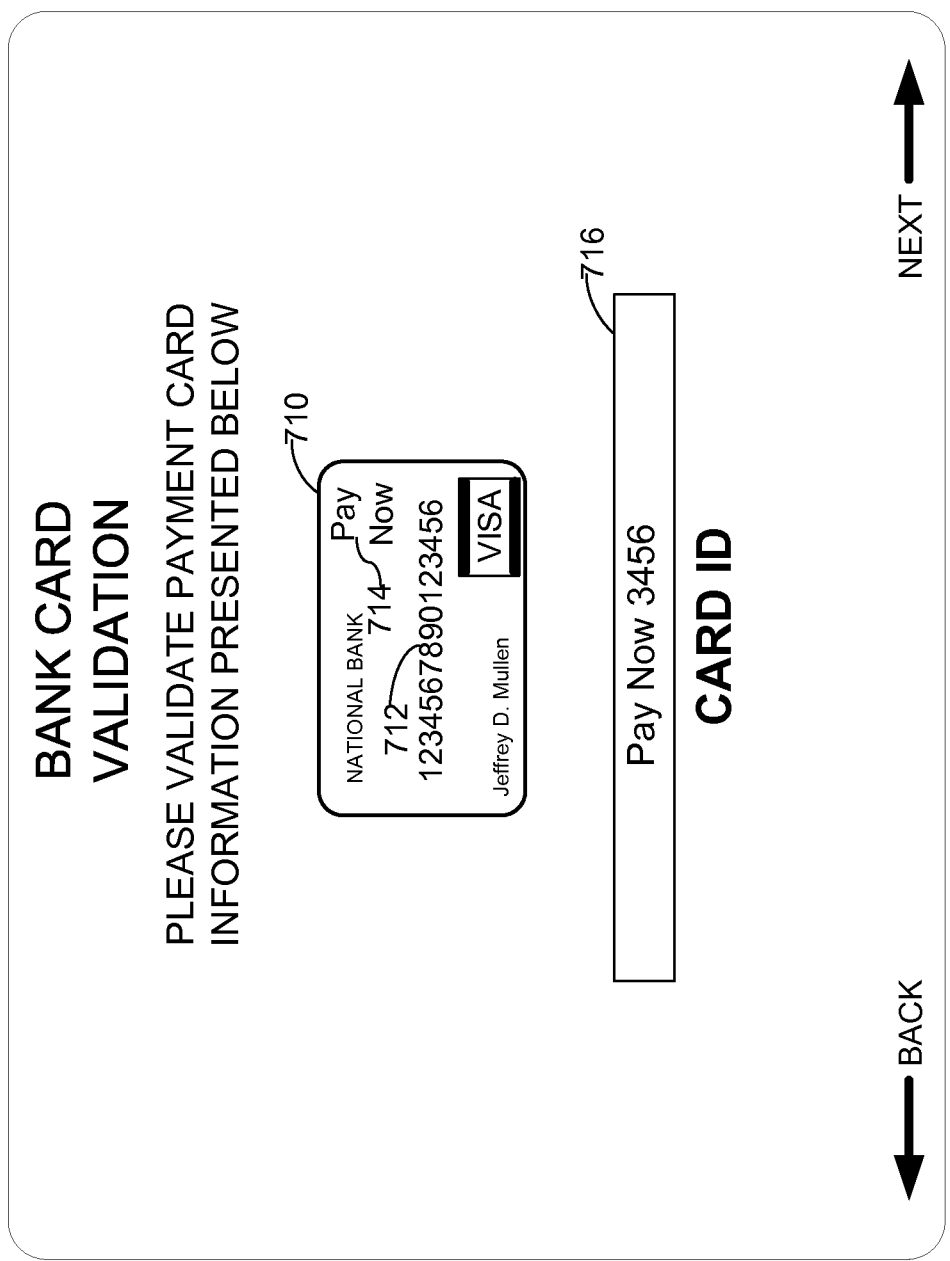
FIG. 7 is an illustration of a display screen constructed in accordance with the principles of the present invention.

FIG. 7 shows GUI 700, that may be generated by a processor of a mobile device and provided onto a display of the mobile device. GUI 700 may, for example, include a bank card validation screen as may be generated by a processor of a mobile device. GUI 700 may, for example, render virtual card 710 so that a user of the mobile device may compare information 712 and 714 to information that the user intended to communicate to the mobile device.

Accordingly, for example, a user may have pressed a button on a powered payment card associated with a debit pay feature and may have communicated the debit pay feature (e.g., within a discretionary data field of a magnetic stripe message) to a mobile device via a contactless communication channel that may have been created between the powered payment card and the mobile device. In so doing, for example, a processor of a mobile device may analyze the debit pay feature received from the powered payment card and may render an indication (e.g., "Pay Now" identifier 714) onto virtual card 710 to indicate that virtual payment card 710 has been stored within the mobile device such that when used by a user of the mobile device to complete a payment transaction, authorizes an immediate deduction of funds from the user's payment account. Alphanumeric entry box 716 may, for example, allow the user to tag stored virtual card 710 with a card identifier that reminds the user of the debit functionality associated with virtual card 710.

Figure 8:
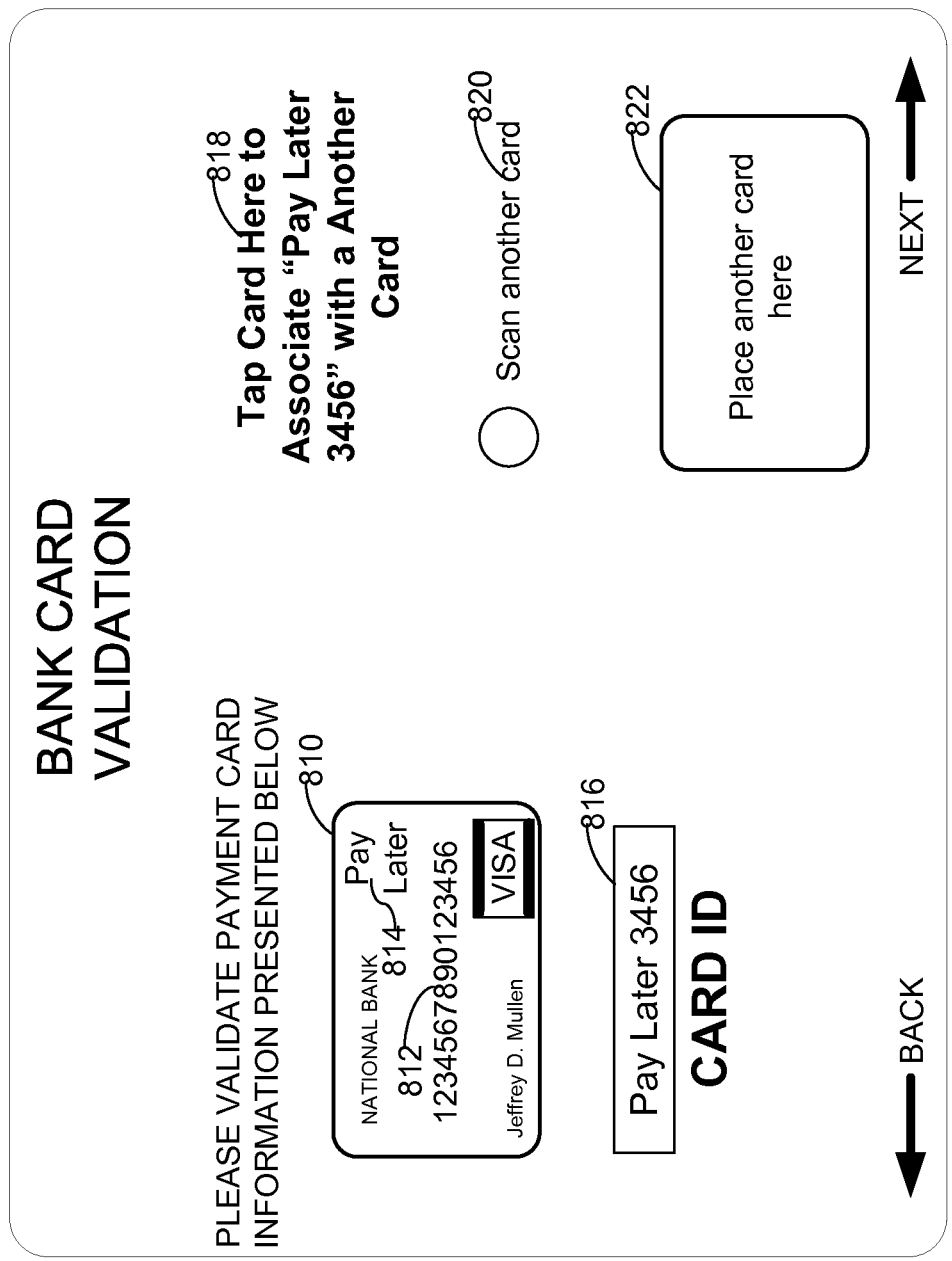
FIG. 8 is an illustration of a display screen constructed in accordance with the principles of the present invention.

FIG. 8 shows GUI 800, that may be generated by a processor of a mobile device and provided onto a display of the mobile device. GUI 800 may, for example, render virtual card 810 to allow a user to verify information previously communicated to a mobile device via a contactless communication channel that may be generated between a powered payment card and the mobile device. A user of a mobile device may, for example, press a button on a powered payment card that may be associated with a credit pay feature and may communicate the credit pay feature along with other payment information (e.g., payment account number 812 and expiration date) via a contactless communication channel to the mobile device.

A processor of a mobile device may, for example, analyze information received from a powered payment card (e.g., information received via a discretionary data field) and may determine that payment information received from the powered payment card may be associated with a credit feature (e.g., "Pay Later" feature 814). Accordingly, for example, a processor of a mobile device may use identifier 814 of virtual card 810 to signify such a credit payment feature.

Virtual card identifier 816 may, for example, be an editable card identifier to allow a user of a mobile device to store and recall virtual card 810 to/from a memory of a mobile device. Card identifier 816 may, for example, be used by a mobile device to access virtual card 810 from a remote location (e.g., a remote server) such that the mobile device need not store sensitive information that may be associated with virtual card 810 within the mobile device.

GUI 800 may, for example, allow an additional card to be associated with virtual card 810. A rewards card may, for example, be associated with a credit account that may be associated with virtual card 810. Accordingly, for example, rewards card information may be communicated to a mobile device by tapping the rewards card against portion 818 to generate a contactless communication channel (e.g., an RFID communication channel) between the rewards card and the mobile device. As per another example, an identification card (e.g., a driver's license) may be associated with virtual card 810. Accordingly, for example, identifying information (e.g., date of birth and a picture) associated with the holder of the identification card may be communicated to a mobile device and stored within the mobile device. In so doing, for example, stored identification information may be recalled from a memory of the mobile device to provide authentication information while completing a purchase transaction using the mobile device.

A user may, for example, select option 820 to allow card information to be scanned into a mobile device using a scanning device (e.g., a camera) of the mobile device. Accordingly, for example, a card (e.g., a driver's license) may be scanned into a mobile device by selecting radio button 820 and holding the driver's license in front of the mobile device while a snapshot of the driver's license is taken by a camera of the mobile device and stored in a memory location of the mobile device. A mobile device may alternately, for example, access identifying information (e.g., name, address, phone number, and picture) from a database (e.g., a motor vehicle database) that may be accessible from a network. Such information may be rendered onto a virtual identification card (e.g., a driver's license) that may be stored within a mobile device. In so doing, for example, user identification data may be recalled from a memory of a mobile device and rendered onto a display of the mobile device, so that a merchant may verify the validity of the user identification data when virtual card 810 is used to complete a purchase transaction in the presence of the merchant.

Card information may be communicated via programming portion 822. A powered card may, for example, provide touch simulation electronics and a light sensor such that when the powered card is placed against portion 822, a two-way contactless communication channel may be created. Accordingly, for example, information may be communicated from the powered card to the mobile device through a series of touch simulations generated by the powered card and sensed by a portion within portion 822 that is touch sensitive. In so doing, for example, a processor of a mobile device may construe a series of touch simulations as a series of data bits communicated by a powered card that may be indicative of information associated with the powered card. GUI 800 may, for example, provide a series of light pulses within portion 822 that may be received by a light sensor of the powered card and construed by a processor of the powered card as data communicated by the mobile device.

Figure 9:
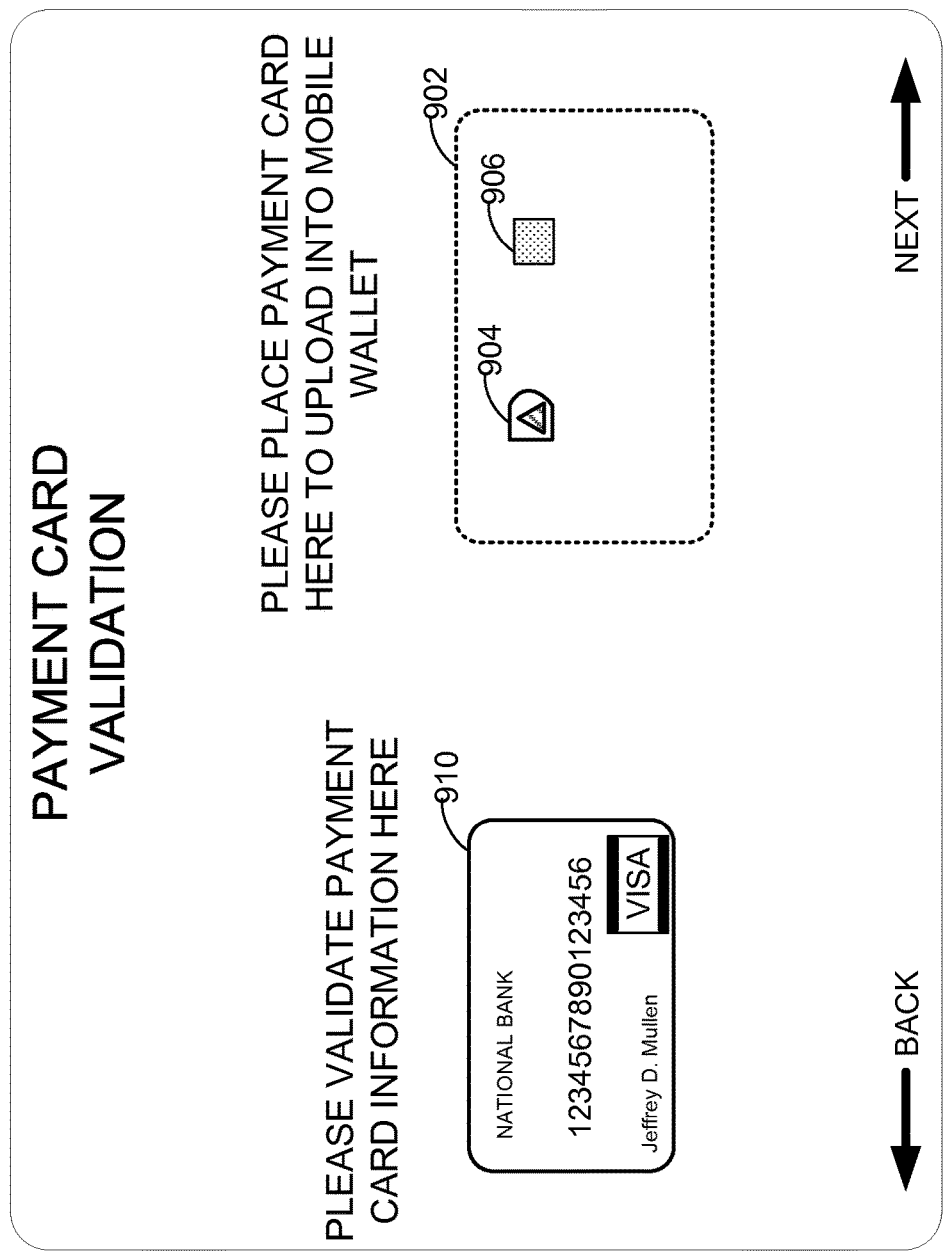
FIG. 9 is an illustration of a display screen constructed in accordance with the principles of the present invention.

FIG. 9 shows GUI 900 that may be generated by a processor of a mobile device and provided onto a display of the mobile device. GUI 900 may, for example, include upload area 902 as generated by a processor of a mobile device. Upload area 902 may, for example, include one or more data exchange areas (e.g., data exchange areas 904 and 906). Icon 904 may, for example, be generated by GUI 900 within an area of a display of a mobile device that may be sensitive to touch (e.g., an area that may be sensitive to a capacitance change). Area 906 may, for example, be generated by GUI 900 within an area of a display of a mobile device that may generate pulses of light.

Information associated with a powered payment card may be uploaded for use by a mobile device by exchanging data with the powered payment card via data exchange areas 904 and 906. For example, a powered payment card may be pressed against upload area 902 so that a touch simulation device of the powered payment card aligns with data exchange area 904 and a light sensing device of the powered payment card aligns with data exchange area 906. Accordingly, for example, the powered payment card may communicate information to a processor of a mobile device by simulating a series of touches in data exchange area 904 and data may be communicated to the powered payment card by a processor of the mobile device by generating a series of light pulses in data exchange area 906. In so doing, for example, a mobile device and a powered payment card may exchange information so that payment card information may be stored within the mobile device.

Once payment card information is uploaded into a mobile device, GUI 900 of the mobile device may display a summary of the uploaded information in validation area 910. Accordingly, for example, one, two or three tracks of magnetic stripe information may be uploaded from a payment card into a mobile device via data exchange area 904 of upload area 902. A portion or all of the uploaded data may, for example, be rendered within validation area 910, so that a user of the mobile device may validate that the correct payment card information was uploaded and stored within the mobile device.

Figure 10:
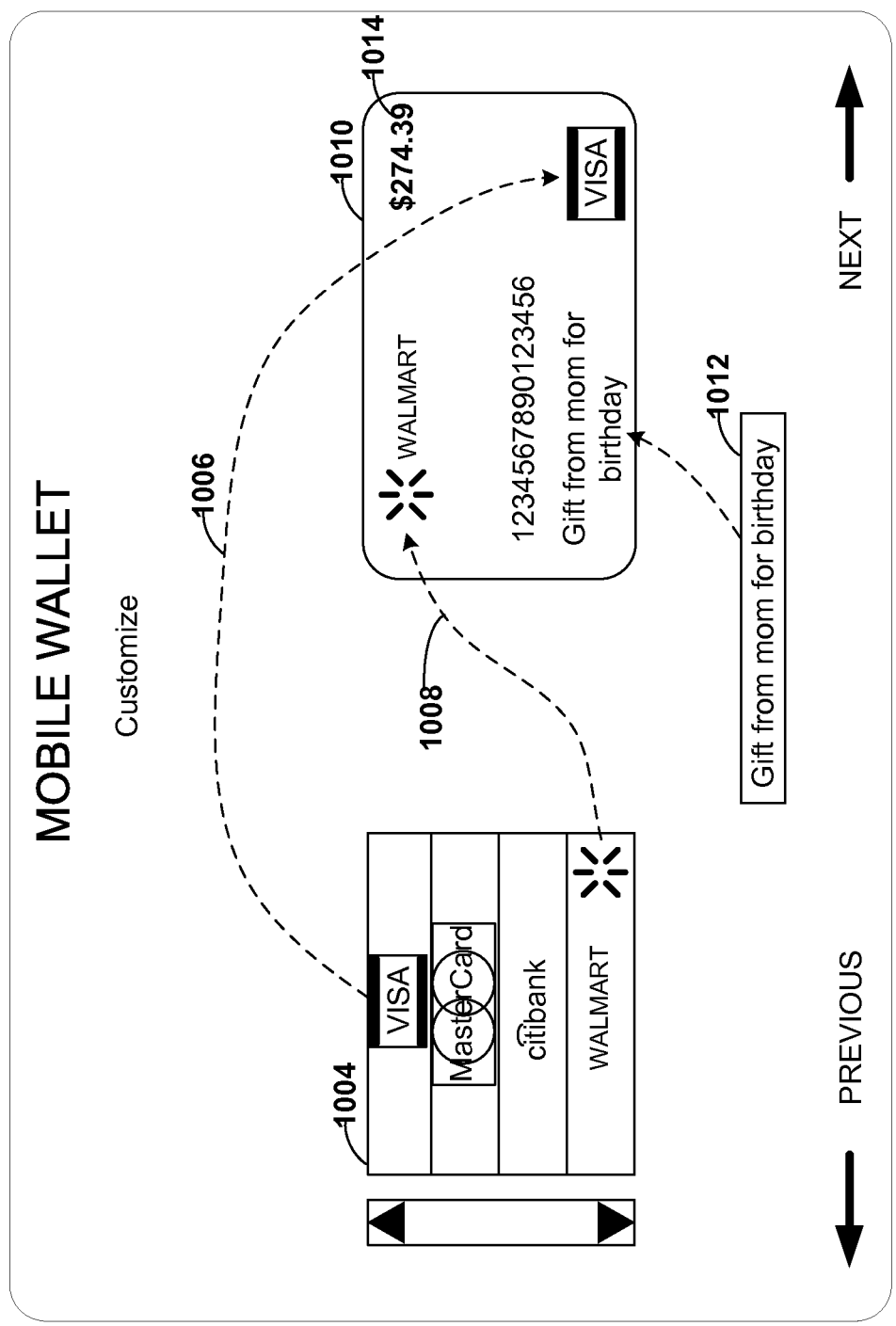
FIG. 10 is an illustration of a display screen constructed in accordance with the principles of the present invention.

FIG. 10 shows GUI 1000 that may be generated by a processor of a mobile device and provided onto a display of the mobile device. GUI 1000 may, for example, render virtual card 1010 and may display a portion of information that may be associated with virtual card 1010. Accordingly, for example, a payment card (e.g., a gift card) may be brought within a proximity or touch relationship with a mobile device such that a contactless communication channel may be generated between the payment card and the mobile device. In so doing, for example, payment account information may be communicated from the payment card to the mobile device and a portion or all of the payment card information may be rendered onto virtual card 1010.

A user of a mobile device may, for example, customize a visual appearance of virtual card 1010 by utilizing any number of graphical user interface objects (e.g., list 1004 and alphanumeric input box 1012) that may be rendered by GUI 1000. A user may, for example, drag-and-drop logos from list 1004 onto virtual card 1010 to more clearly identify virtual card 1010. Accordingly, for example, a user may identify virtual card 1010 as a gift card (e.g., a Walmart gift card), using drag-and-drop operation 1008, having a particular network brand (e.g., a VISA network brand), using drag-and-drop operation 1006. A user may, for example, annotate virtual card 1010 using alphanumeric input box 1012 with any identifying information that may be useful to the user (e.g., information that may be used to recall virtual card 1010 from a memory of a mobile device).

A mobile device may, for example, disallow certain customizations that may conflict with virtual card 1010. Accordingly, for example, a mobile device may prevent a user from applying a different network logo than was previously communicated by a physical card to the mobile device. In so doing, for example, a mobile device may prevent a user from customizing virtual card 1010 as, for example, a M/C network brand, when a payment card number previously communicated from a payment card to a mobile device indicated that the payment card was, for example, a payment card having a VISA network brand.

A credit balance, for example, may be communicated by a gift card to a mobile device via a contactless communication channel generated between the gift card and the mobile device and may be displayed as account balance 1014 to represent an amount of credit that may be remaining on virtual card 1014. Virtual card 1010 may, for example, be used by a mobile device to complete a purchase transaction in which payment card information associated with virtual card 1010 may be communicated to a merchant terminal (e.g., communicated via an RFID communication channel) and an amount of the purchase may be communicated from the merchant terminal to the mobile device. Accordingly, for example, account balance 1014 may be updated (e.g., reduced) by the amount of the purchase and displayed so that a user of the mobile device may be updated as to an amount of credit remaining on virtual card 1010.

A user of a mobile device may, for example, purchase additional credit to be added to virtual card 1010. Accordingly, for example, account balance 1014 may be updated (e.g., increased) when an amount of credit is added to virtual card 1010. In so doing, for example, an amount of credit added to virtual card 1010 may be communicated (e.g., communicated via an RFID communication channel) to a mobile device by a merchant terminal and updated via account balance 1014 so that a user of the mobile device may receive up-to-date information relating to a credit balance that may be available on virtual card 1010. As per an example, a user may recall a virtual payment card from a memory of a mobile device, activate the payment card for use, and use the mobile device to purchase additional credit on virtual card 1010 using the activated payment card as the payment vehicle.

Figure 11:
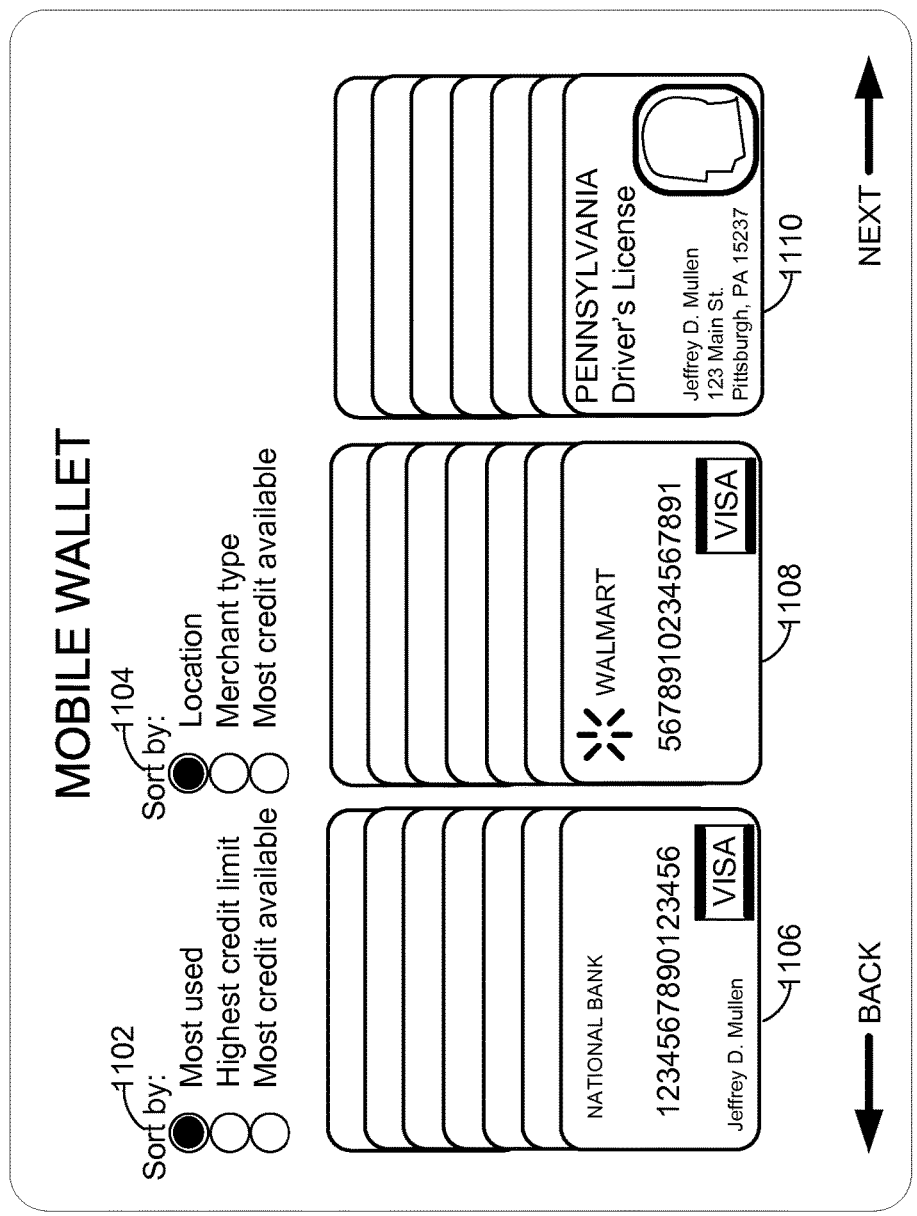
FIG. 11 is an illustration of a display screen constructed in accordance with the principles of the present invention.

FIG. 11 shows GUI 1100 that may be generated by a processor of a mobile device and provided onto a display of the mobile device. GUI 1100 may, for example, provide a visual representation of all virtual cards that may be stored within a memory of a mobile device (or within a remote server) and may display each virtual card within one or more categories that may be associated with each virtual card. A processor of a mobile device may, for example, analyze information received from a physical card via a contactless communication channel (e.g., an RFID, electromagnetic, visible, audible, capacitive, or magnetic communication channel) to determine a card category that may be associated with the corresponding virtual card.

An account number may, for example, be communicated by a card to a processor of a mobile device that may identify the card as a particular card type (e.g., bank card, rewards card, identification card, healthcare card, travel card or airline card). Accordingly, for example, each virtual card stored within a memory of a mobile device may be assigned a category index by a processor of the mobile device and may then be rendered onto GUI 1100 in accordance with the category index assigned. As per another example, a user of a mobile device may assign a category index (e.g., card identification) to a virtual card after information associated with a corresponding physical card is communicated to the mobile device via a contactless communication channel.

One or more payment cards, for example, may be rendered onto GUI 1100 and each payment card may be aligned within category 1106. An ordering of each payment card in category 1106 may, for example, be established by a user of a mobile device via sort options 1102. A mobile device may, for example, maintain statistics (e.g., number of times each virtual payment card is recalled from a memory of a mobile device and used to complete a purchase transaction via the mobile device). Accordingly, for example, upon selection of one of sort options 1102 (e.g., Most used), a processor of a mobile device may recall usage statistics that may be associated with each virtual payment card stored within a memory of a mobile device and may display each virtual payment card within category 1106 onto GUI 1100 in accordance with such usage statistics (e.g., the top virtual payment card displayed within category 1106 may have the most usages of all virtual payment cards stored within a memory of the mobile device).

A mobile device may, for example, maintain other information associated with virtual payment cards of category 1106. Accordingly, for example, a mobile device may access network devices (e.g., issuer servers) associated with each virtual payment card stored within the mobile device. In so doing, for example, a mobile device may collect information (e.g., credit limit and credit available) associated with each virtual payment card stored within a memory of the mobile device and may display each virtual payment card on GUI 1100 in accordance with sort options 1102 (e.g., the top card displayed within category 1106 may have the highest credit limit or may have the most credit available).

Category 1108 may, for example, be associated with all virtual gift cards that may be stored within a memory of a mobile device (or remote server). Information associated with each virtual gift card may, for example, include a merchant identifier, a merchant type identifier, and an amount of credit available. Accordingly, for example, a user may select one of sort options 1104 (e.g., Most credit available) to display a list of virtual gift cards within category 1108 in a descending order, where the top virtual gift card of category 1108 may have the highest credit available.

A mobile device may, for example, be a locating device (e.g., a GPS) or may, for example, include location determination electronics.

Accordingly, for example, a mobile device may determine its own location and may determine whether its location corresponds with a location of a merchant's place of business that may be associated with a virtual gift card of category 1108. In so doing, for example, a mobile device may determine that its location is within a Walmart store and if, for example, sort options 1104 is selected to "Location", then a processor of the mobile device may re-order the virtual gift cards of category 1106 such that a Walmart virtual gift card is displayed as the top card in the stack. Accordingly, for example, the Walmart virtual gift card may be conveniently located within GUI 1100 for selection by a user of a mobile device to use during a purchase transaction conducted between a contactless communication channel formed between the mobile device and a merchant terminal at the Walmart store.

Virtual cards may, for example, be autonomously sorted across categories depending upon a virtual card placement that may exist in a particular category. A virtual payment card may, for example, be selected to occupy a top card placement within category 1106. A virtual rewards card may, for example, be associated with the virtual payment card selected for top placement in category 1106. Accordingly, for example, the associated virtual rewards card may be selected for top placement within category 1108 based upon its association with the virtual payment card selected for top placement within category 1106. As per another example, a virtual identification card (e.g., a virtual driver's license card) may be selected for top placement within category 1110 based upon its general association with any virtual payment card selected for top placement within category 1106 or its general association with any virtual gift card selected for top placement within category 1108.

Figure 12:
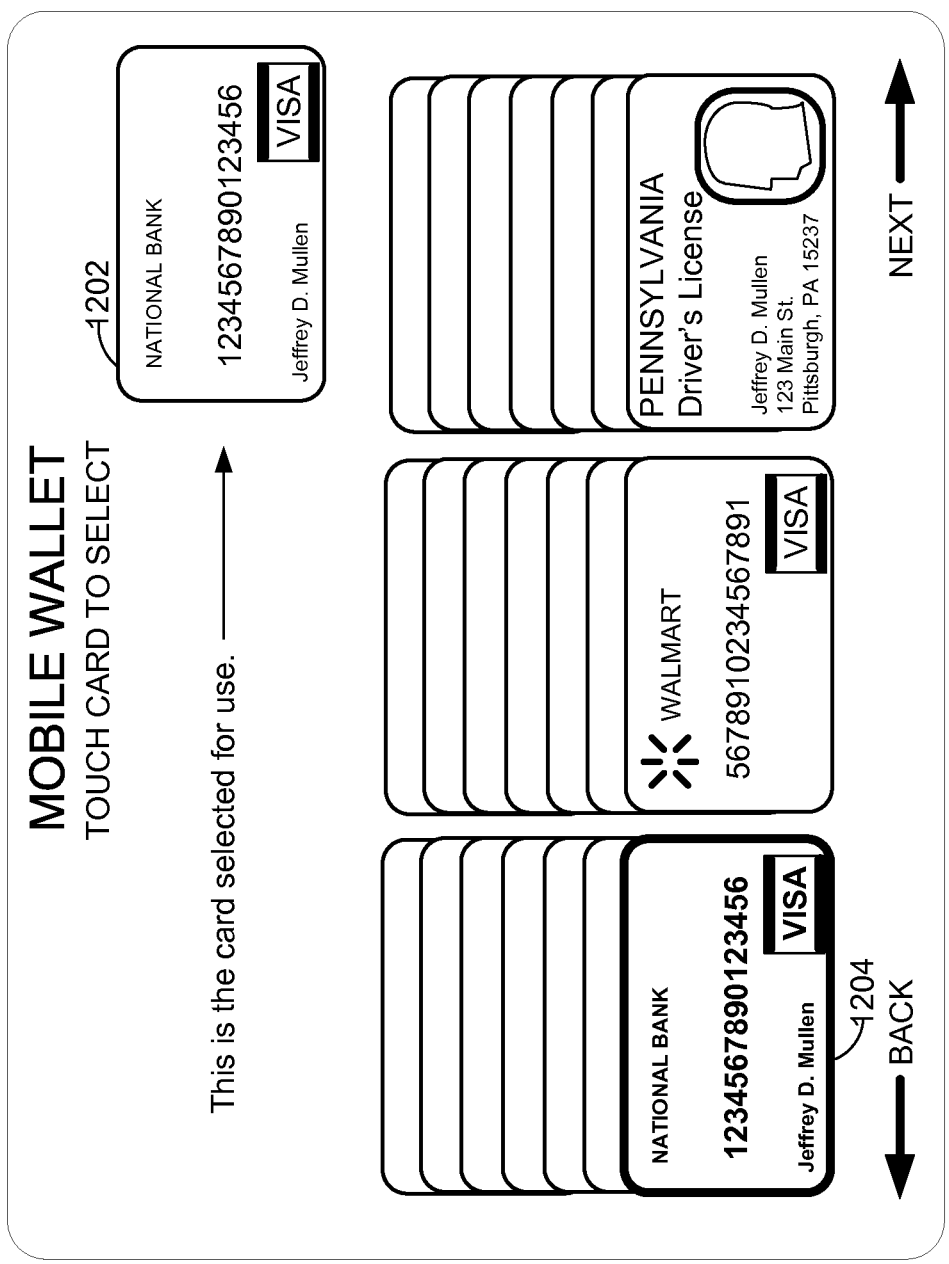
FIG. 12 is an illustration of a display screen constructed in accordance with the principles of the present invention.

FIG. 12 shows GUI 1200 that may be generated by a processor of a mobile device and provided onto a display of the mobile device. GUI 1200 may, for example, provide a visual representation of all virtual cards that may be stored within a mobile device (or remote server) and may display each virtual card within one or more categories that may be associated with each virtual card. GUI 1200 may, for example, be rendered onto a touch-sensitive display of a mobile device, such that by touching a location of the display that corresponds to a location of a virtual card, that card may be selected for use. Accordingly, for example, a user may touch any area within virtual card 1204 to activate virtual card 1204 for use. In so doing, for example, indicia may be provided on GUI 1200 to indicate that virtual card 1204 has been selected for use (e.g., an outline of virtual card 1204 may be highlighted) and a copy of virtual card 1204 (e.g., virtual card 1202) may be rendered onto GUI 1200 to indicate to a user of the mobile device that virtual card 1202 has been selected for use.

Figure 13:
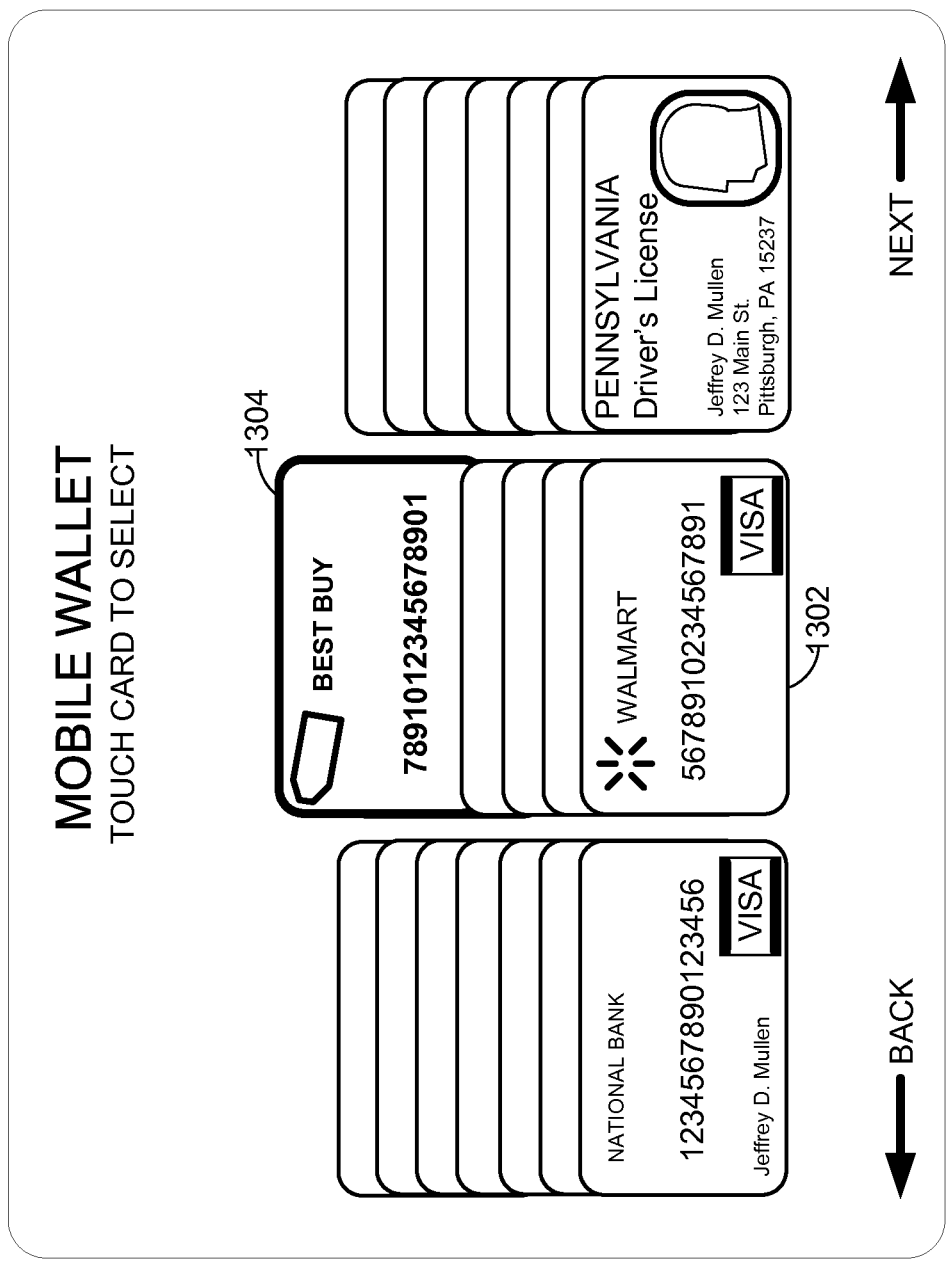
FIG. 13 is an illustration of a display screen constructed in accordance with the principles of the present invention.

FIG. 13 shows GUI 1300 that may be generated by a processor of a mobile device and provided onto a display of the mobile device. GUI 1300 may, for example, allow a user of a mobile device to select (e.g., touch) one of the virtual cards rendered onto GUI 1300. Once selected, the virtual card may rise from its position (e.g., virtual card 1304 may be elevated above the neighboring virtual cards in category 1302) and may be highlighted to indicate the selection to a user. Once elevated, the selected virtual card (e.g., card 1304) may display relevant information associated with the virtual card (e.g., information displayed on a front surface of the virtual card such as account number and merchant affiliation) so that a user may verify that the selected virtual card is the virtual card that the user wishes to use. If the selected virtual card is not the virtual card that the user wishes to use, then the user may deselect (e.g., touch) the selected virtual card and the virtual card may fall back within the ranks of its neighboring virtual cards. If the selected virtual card is the virtual card that a user wishes to use, then the user may confirm (e.g., touch the selected virtual card twice) that the selected card is the desired virtual card for use.

Figure 14:
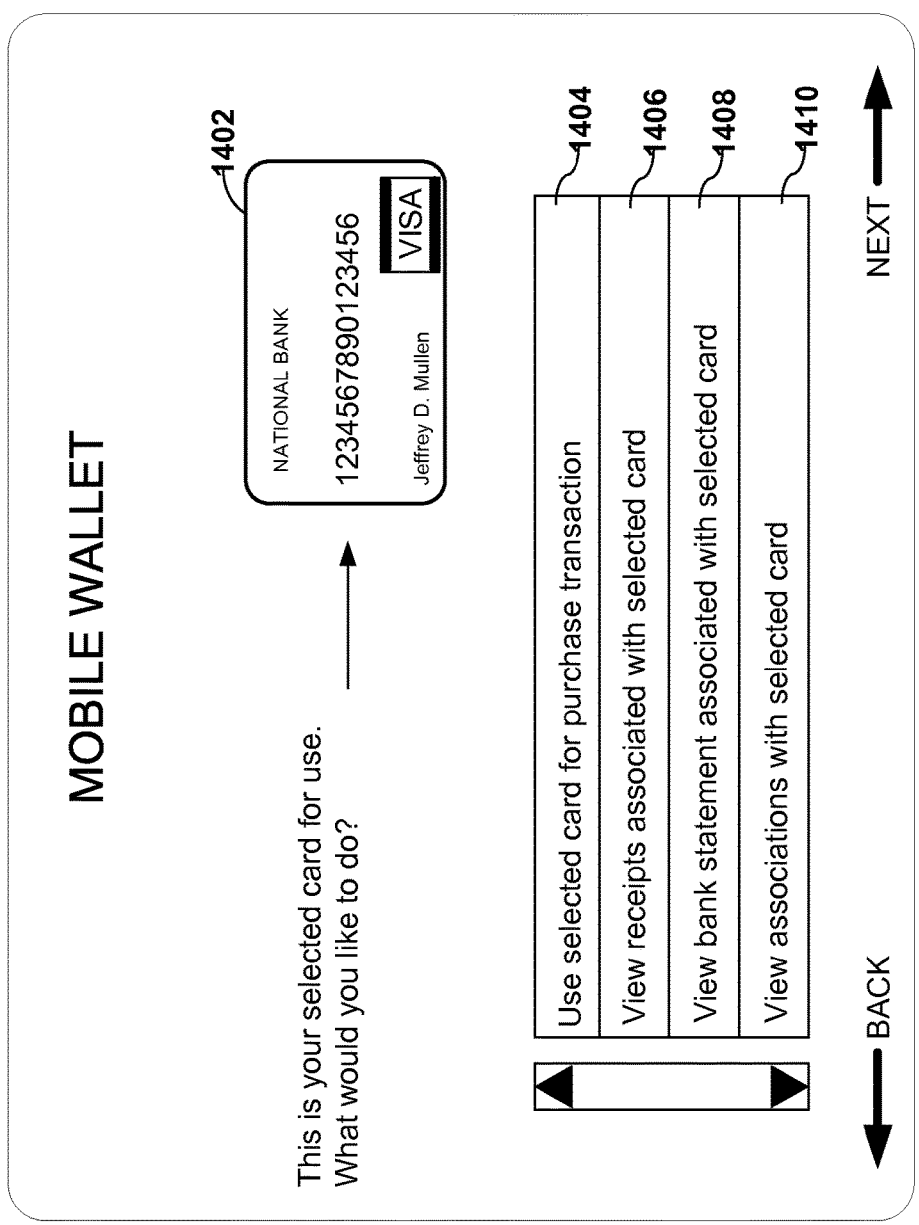
FIG. 14 is an illustration of a display screen constructed in accordance with the principles of the present invention.

FIG. 14 shows GUI 1400 that may be generated by a processor of a mobile device and provided onto a display of the mobile device. GUI 1400 may, for example, allow a user of a mobile device to use selected virtual card 1402 in some manner. A user may, for example, wish to complete a purchase transaction using the mobile device and selected virtual card 1404. Accordingly, for example, upon selection of option 1404, information associated with selected virtual card 1402 may be communicated from a mobile device to, for example, a merchant terminal to complete a purchase transaction. In so doing, for example, a contactless communication channel (e.g., an RFID communication channel) may be formed between the mobile device and the merchant terminal and payment information (e.g., payment account number and expiration date) may be communicated from the mobile device to the merchant terminal via the contactless communication channel. As per another example, other information (e.g., one, two, or three tracks of magnetic stripe information) that may be associated with virtual card 1402 may be communicated by the mobile device to the merchant terminal when the mobile device detects the presence of an RFID communication channel formed between the mobile device and the merchant terminal.

A mobile device may, for example, request electronic receipts to be delivered to the mobile device after purchase transactions are completed. Accordingly, for example, receipts may be delivered to the mobile device via an electronic delivery method (e.g., text messaging or email) and may be stored within a memory of the mobile device for future use. In so doing, for example, a user may select option 1406 to view a list of one or more receipts that may be associated with purchases conducted via the mobile device and virtual card 1402.

A mobile device may, for example, request electronic bank statements to be delivered to the mobile device at the end of each billing cycle of virtual card 1402. Alternately, for example, a mobile device may access a network entity (e.g., an issuer's server) to retrieve bank statement information that may be associated with virtual card 1402. Accordingly, for example, a user of a mobile device may review any and all bank statements associated with virtual card 1402 that a user's mobile device may have collected via its network access capabilities (e.g., a wireless access point or cellular network access infrastructure).

A mobile device may, for example, allow virtual card 1402 to be associated with one or more virtual cards stored within a memory of the mobile device (or remote server). For example, virtual card 1402 may be associated with one or more cards (e.g., a rewards card and a driver's license) and a user of a mobile device may view such associations using a GUI of the mobile device.

A mobile device may, for example, allow virtual card 1402 to be associated with one or more virtual cards that may be stored within a memory of another mobile device and/or may allow virtual card 1402 to be associated with one or more physical cards not stored within any mobile device. Virtual card 1402 may, for example, be one of many (e.g., two) cards issued against the same general account (e.g., a husband and wife joint charge account). Accordingly, for example, a mobile device may recognize that virtual card 1402 is one of a pair of cards associated with such a joint account and may provide information to the user of the mobile device about such associations.

Figure 15:
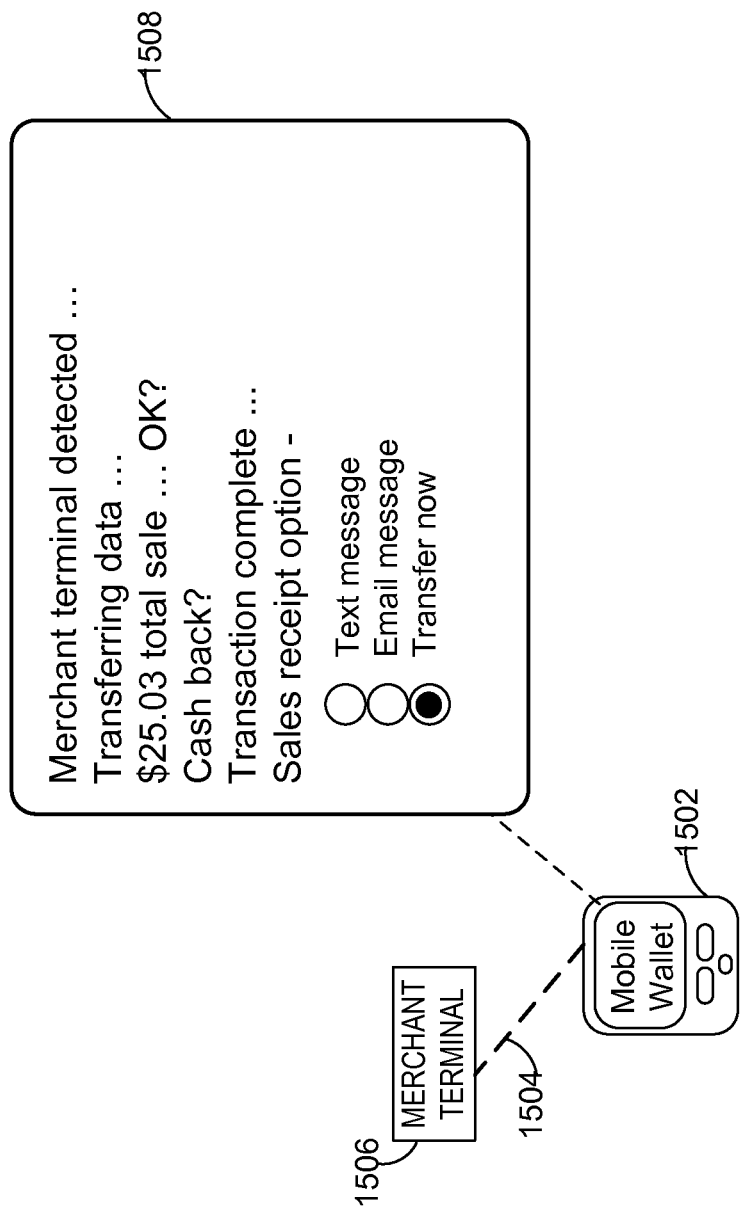
FIG. 15 is an illustration of a mobile wallet system constructed in accordance with the principles of the present invention.

FIG. 15 shows system 1500, which may include a mobile device (e.g., mobile wallet 1502), merchant terminal 1506 and GUI 1508 that may be executed by a processor of mobile wallet 1502. A user of mobile wallet 1502 may recall a virtual card (e.g., a virtual payment card) from a memory of mobile wallet 1502 (or from a remote server) and use mobile wallet 1502 to communicate payment information associated with the virtual payment card to a merchant terminal. Accordingly, for example, a user of mobile wallet 1502 may have selected a virtual payment account from within a memory of mobile wallet 1502 (or remote server) to complete a payment transaction.

Once mobile wallet 1502 is brought within a communication distance (e.g., within approximately 2 inches) of merchant terminal 1506, a contactless communication channel (e.g., RFID communication channel 1504) may be generated between mobile wallet 1502 and merchant terminal 1506. Payment information associated with a virtual payment card selected by a user of mobile wallet 1502 may, for example, be autonomously communicated by a processor of mobile wallet 1502 to merchant terminal 1506 via contactless communication channel 1504 once a presence of merchant terminal 1506 is detected by the processor of mobile wallet 1502.

Contactless communication channel 1504 may, for example, be a two-way communication channel. Accordingly, for example, merchant terminal 1506 may communicate information to mobile wallet 1502 via contactless communication channel 1504. In so doing, for example, merchant terminal 1506 may communicate a total sale amount to mobile wallet 1502 and may wait for a user of mobile wallet 1502 to acknowledge that the total sale amount is correct (e.g., a user of mobile wallet 1502 may press an acknowledgment key that causes mobile wallet 1502 to communicate a confirmation message to merchant terminal via contactless communication channel 1504). Further communication from merchant terminal 1506 may query mobile wallet 1502 as to whether a user of mobile wallet 1502 requires cash back.

Once a purchase transaction is completed, a user of mobile wallet 1502 may request a receipt to be delivered to mobile wallet 1502 via any one of a number of mediums. A user may, for example, request that a receipt be delivered to mobile wallet 1502 at a later time (e.g., receipt queued for delivery at a later time via text messaging or email). A user may, for example, request that a receipt be delivered to mobile wallet 1502 immediately. Accordingly, for example, an electronic receipt may be generated by merchant terminal 1506 and communicated to mobile wallet 1502 via contactless communication channel 1504.

An application executing on a mobile device (e.g., a receipt handler application associated with GUI 1500) may have its own address. Accordingly, for example, the receipt handler's address may be well known within a network (e.g., a payment network), such that a server (e.g., an email server associated with a merchant's payment server) may email an electronic receipt directly to the receipt handler application that may be running on the mobile device. In so doing, for example, one or more applications running on a mobile device may have well known addresses (e.g., email addresses and multimedia message addresses) associated with them, so that the applications may directly communicate with network entities to autonomously provide a user of the mobile device with up-to-date and valuable information.

Figure 16:
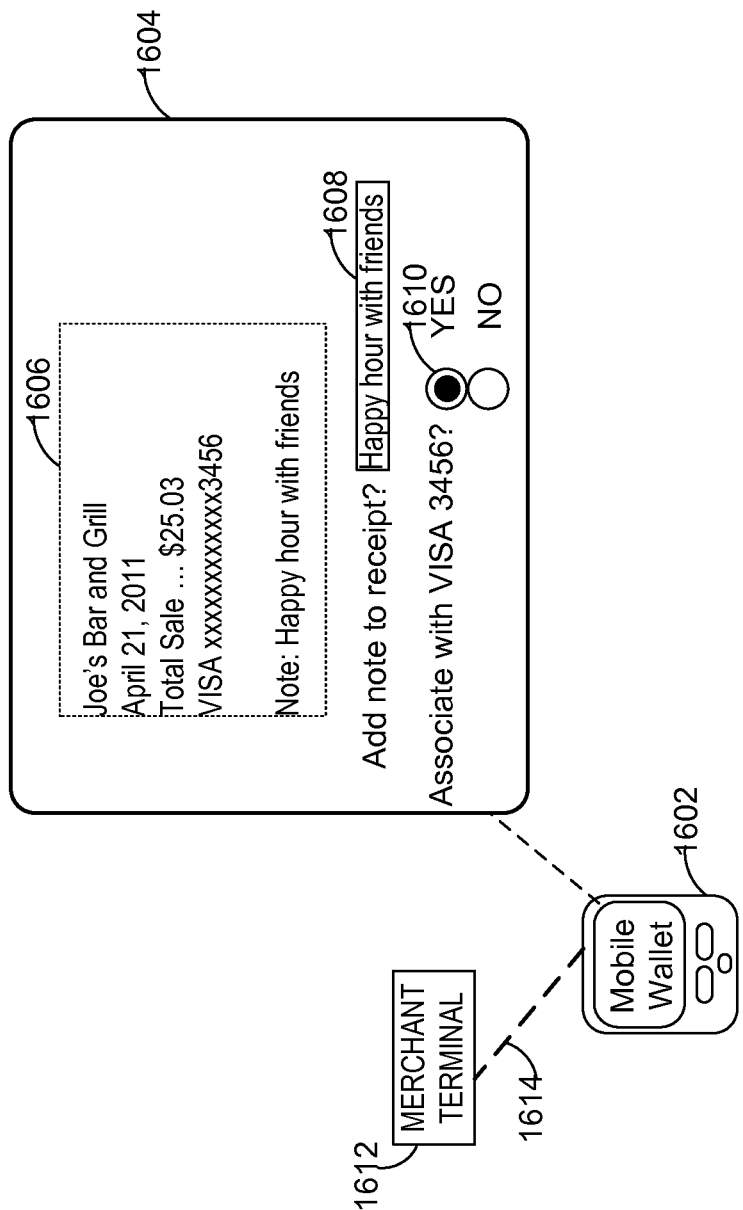
FIG. 16 is an illustration of a mobile wallet system constructed in accordance with the principles of the present invention.

FIG. 16 shows system 1600, which may include a mobile device (e.g., mobile wallet 1602), merchant terminal 1612 and GUI 1604 that may be executed by a processor of mobile wallet 1602. Mobile wallet 1602 may, for example, complete a purchase transaction with merchant terminal 1612 by exchanging payment information with merchant terminal 1612 via a contactless communication channel (e.g., RFID communication channel 1614). Merchant terminal 1612 may, for example, communicate electronic receipt 1606 to mobile wallet 1602 after a purchase transaction completes. Electronic receipt 1606 may, for example, be displayed by a processor of mobile wallet 1602 onto GUI 1604 so that a user of mobile wallet 1602 may view electronic receipt 1606 and may execute certain options that may be associated with electronic receipt 1606.

Mobile wallet 1602 may, for example, allow a user of mobile wallet 1602 to annotate electronic receipt 1606 with a note that may be entered into alphanumeric entry box 1608. Mobile wallet 1602 may, for example, allow electronic receipt 1606 to be associated with a virtual card (e.g., virtual payment card VISA 3456 that was used to complete the purchase transaction) stored within a memory of mobile wallet 1602.

Figure 17:
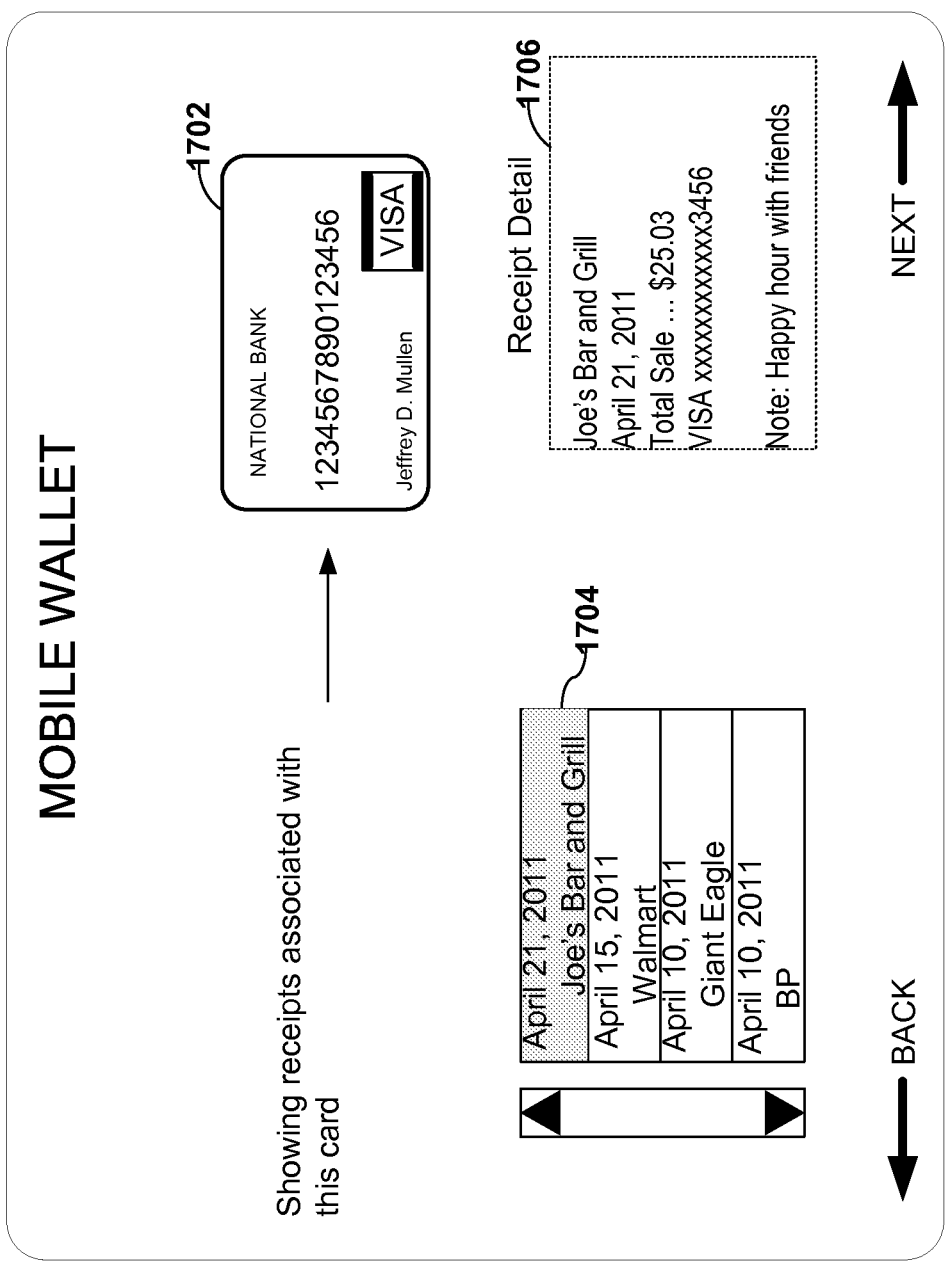
FIG. 17 is an illustration of a display screen constructed in accordance with the principles of the present invention.

FIG. 17 shows GUI 1700 that may be generated by a processor of a mobile device and provided onto a display of the mobile device. GUI 1700 may, for example, allow a user of a mobile device to view receipts that may be associated with a selected virtual card. Accordingly, for example, a user of a mobile device may select a virtual card (e.g., virtual payment card 1702) and may view a summary of receipts that may be associated with virtual payment card 1702. In so doing, for example, a user may select summary receipt 1704 (e.g., by touching portion 1704 on GUI 1700) and a processor of the mobile device may retrieve details of summary receipt 1704 from a memory of the mobile device and display them in receipt detail area 1706.

Figure 18:
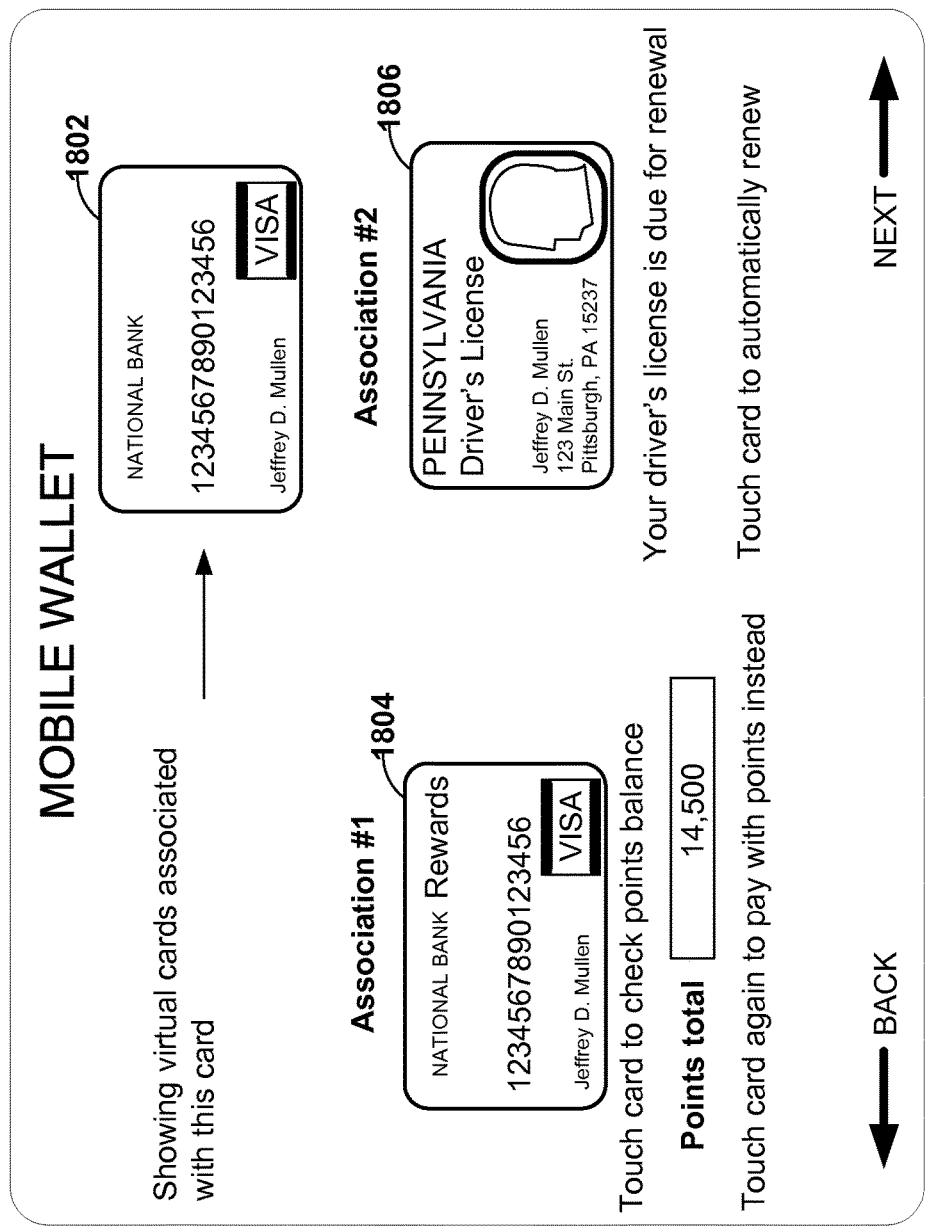
FIG. 18 is an illustration of a display screen constructed in accordance with the principles of the present invention.

FIG. 18 shows GUI 1800 that may be generated by a processor of a mobile device and provided onto a display of the mobile device. GUI 1800 may, for example, allow a user of a mobile device to view virtual cards stored within a memory of the mobile device (or remote server) that may be associated with a selected virtual card. Accordingly, for example, selected virtual card 1802 may have an association with virtual rewards card 1804 and selected virtual card 1802 may have an association with virtual identification card 1806.

A mobile device may, for example, access a user's rewards account by accessing a network entity (e.g., an issuer's server) to determine information associated with the rewards account (e.g., number of rewards points earned). A mobile device may, for example, access the network entity on a regularly scheduled basis and store the retrieved rewards account information within a memory location of the mobile device. A mobile device may, for example, access the network entity only upon demand to retrieve rewards account information and may only display the retrieved rewards account information without storing the retrieved rewards account information.

GUI 1800 may, for example, allow a user to obtain further information that may be associated with virtual cards 1804 and/or 1806. A user may, for example, touch a display of a mobile device in the vicinity of virtual card 1804 to obtain other information (e.g., a rewards point balance) associated with virtual card 1804. Accordingly, for example, a user may obtain a rewards points total that may be associated with virtual card 1804 and may touch virtual card 1804 again to conduct a purchase transaction with rewards points that may be associated with virtual card 1804. In so doing, for example, a mobile device may, for example, establish a contactless communication channel (e.g., an RFID communication channel) with a merchant terminal and may communicate points information that may be associated with virtual card 1804 so that a purchase transaction may be completed using rewards points that may be associated with virtual card 1804.

GUI 1800 may, for example, provide other information to a user concerning virtual card 1806. For example, a processor of a mobile device may detect that an expiration date of virtual card 1806 is approaching. Accordingly, for example, a user may touch a display in the vicinity of virtual card 1806 to automatically renew the driver's license using the mobile device. In so doing, for example, a mobile device may contact a network entity (e.g., a driver's license renewal server) to order a renewal driver's license. The renewal driver's license may, for example, be delivered to the user as a physical card, in which case the user may upload information associated with the physical driver's license into the mobile device via a contactless communication channel formed between the physical driver's license and the mobile device. Alternately, for example, a mobile device may receive an electronic copy of a virtual driver's license and replace information associated with virtual card 1806 with the updated information received from a driver's license renewal server.

Figure 19:
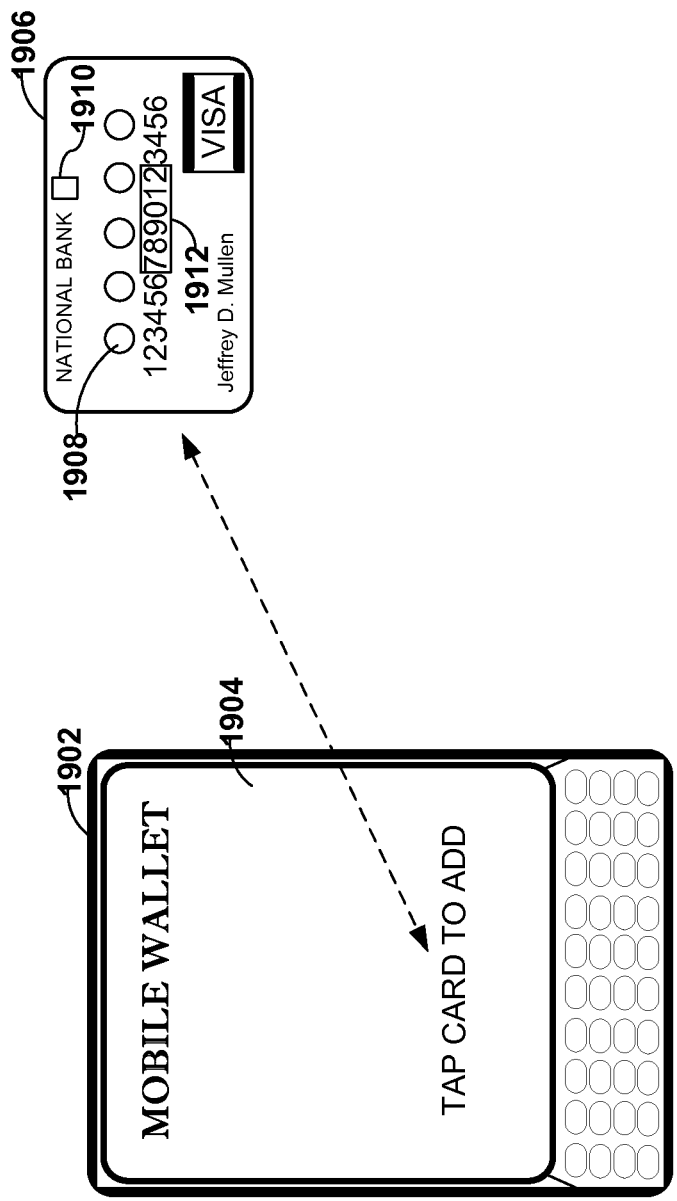
FIG. 19 is an illustration of a mobile wallet system constructed in accordance with the principles of the present invention.

FIG. 19 shows system 1900, which may include mobile wallet 1902 and a powered card (e.g., powered payment card 1906). Powered card 1906 may, for example, include a contactless communication device (e.g., an RFID) that may communicate with a contactless communication device (e.g., an RFID) of mobile wallet 1902. A GUI executed by a processor of mobile wallet 1902 may invite a user of powered card 1906 to tap powered card 1906 against display 1904 of mobile wallet 1902. Such contact with, or proximity to, mobile wallet 1902 may generate a contactless communication channel within which information may be exchanged between powered card 1906 and mobile wallet 1902.

As per another example, powered card 1906 may include circuitry that may simulate a touch. Display 1904 may be touch-sensitive. Accordingly, for example, powered card 1906 may communicate data to mobile wallet 1902 by simulating a series of touches that may be sensed by display 1904 and processed by a processor of mobile wallet 1902 as data received from powered card 1906. Powered card 1906 may include light sensor 1910. Accordingly, for example, a processor of mobile wallet 1902 may generate a series of light pulses on a portion of display 1904 that may be detected by light sensor 1910 of powered card 1906 and processed by a processor of powered card 1906 as data communicated by mobile wallet 1902. In so doing, for example, data may be communicated by powered card 1906 via a series of simulated touches and data may be communicated by mobile wallet 1902 via a series of light pulses.

Information communicated by powered card 1906 to mobile wallet 1902 may, for example, include payment information (e.g., payment account number, expiration date, and cardholder name). Information communicated by powered card 1906 to mobile wallet 1902 may, for example, include other information relating to a configuration of powered card 1906 including, for example, whether or not a display exists and if so, at what location; whether or not a manual input interface (e.g., one or more buttons) exists and if so, at what location; and whether or not a light sensor exists and if so, at what location. Accordingly, for example, configuration information relating to powered card 1906 may be communicated to mobile wallet 1902, so that when a virtual card relating to powered card 1906 is generated and stored within mobile wallet 1902, the virtual card may employ all of the features that may be employed by its physical counterpart.

Information communicated by powered card 1906 may, for example, be encrypted. Decryption may, for example, be executed within mobile wallet 1902 so that information communicated by powered card 1906 may be stored within a memory of mobile wallet 1902 in a decrypted format. Alternately, for example, information communicated by powered card 1906 may be stored within a memory of mobile wallet 1902 in an encrypted format. Mobile wallet 1902 may, for example, authenticate itself to a network entity (e.g., an issuer server) such that each time encrypted information is recalled from a memory of mobile wallet 1902, a decryption key may be communicated by the network entity to mobile wallet 1902 for decryption purposes.

Figure 20:
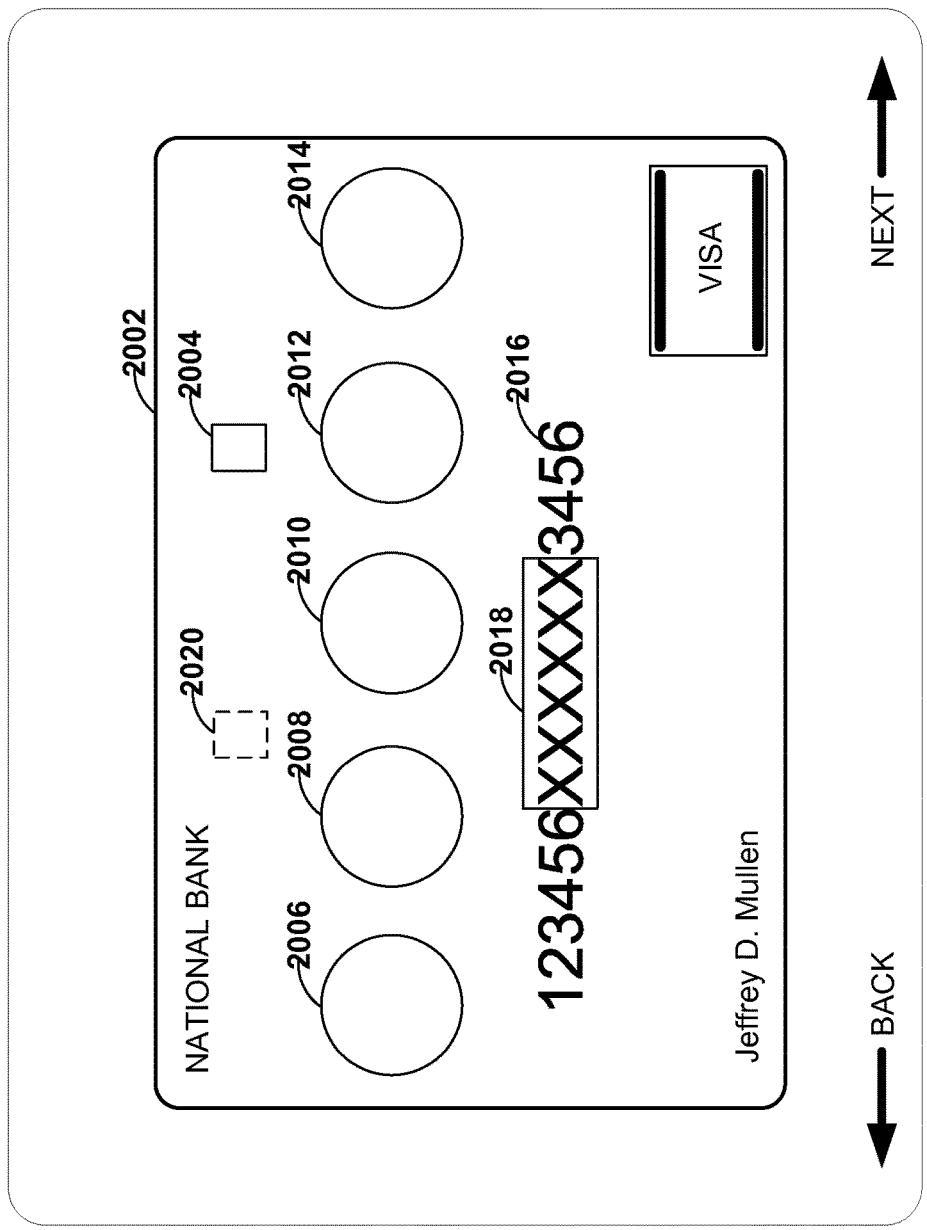
FIG. 20 is an illustration of a display screen constructed in accordance with the principles of the present invention.

FIG. 20 shows GUI 2000 that may be generated by a processor of a mobile device and provided onto a display of the mobile device. GUI 2000 may, for example, display virtual card 2002 that may employ all of the features of its physical counterpart.

Accordingly, for example, manual input interfaces (e.g., virtual buttons 2006 through 2014) may have the same functionality on virtual card 2002 as they do on the physical counterpart to virtual card 2002. In so doing, for example, virtual buttons 2006 through 2014 may be displayed on portions of GUI 2000 that may be touch-sensitive, such that when virtual buttons 2006 through 2014 are touched, a processor of the mobile device may impart a functionality to the mobile device just as if the mobile device itself was the physical card (e.g., a PIN may be entered into virtual card 2002 via one or more buttons 2006-2014 to unlock virtual dynamic portion 2018 of virtual payment card number 2016).

A mobile device may, for example, provide a light-sensitive display, such that when virtual card 2002 is rendered onto the light-sensitive display, light sensor 2004 may exhibit the same functionality as its physical counterpart. Accordingly, for example, virtual card 2002 may be rendered so that light sensor 2004 exists on a light-sensitive portion of a display of a mobile device. A processor of the mobile device may, for example, detect light pulses sensed at light sensor 2004 as data communicated to virtual card 2002. In so doing, for example, virtual card 2002 may receive information that changes the functionality of virtual card 2002 (e.g., an expiration date of virtual payment card 2002 may be updated via light sensor 2004).

A mobile device may, for example, provide a display that may simulate touch. Accordingly, for example, virtual card 2002 may be rendered onto a display of a mobile device so that touch-simulating portion 2020 aligns with a portion of the display that may be capable of simulating touch. In so doing, for example, virtual card 2002 may communicate information to another device (e.g., another mobile device) when touch-simulating portion 2020 of GUI 2000 is pressed against another device (e.g., a touch-sensitive display of another mobile device) and simulates a series of touches that may be construed by a processor of the other device as data communicated to the other device.

Virtual display 2018 may, for example, display a dynamic portion of payment card number 2016 just as it would be displayed on the physical counterpart to virtual card 2002. For example, virtual card 2002 may be disabled for use when virtual display 2018 does not display a valid portion of virtual card number 2016. Upon entry of a password (e.g., a PIN may be entered by touching one or more buttons 2006-2014 that corresponds to the PIN), virtual card 2002 may be activated for use. Accordingly, for example, once a valid PIN is entered, virtual display 2018 may be populated with a remaining portion of virtual payment card number 2016 thereby activating virtual card 2002 for use. In so doing, for example, a mobile device that displays activated virtual card 2002 via GUI 2000 may communicate payment information (e.g., virtual payment card number 2016 and expiration date) to a device (e.g., a merchant terminal) via a contactless communication channel (e.g., an RFID communication channel) so that a purchase transaction may be completed between the mobile device and the merchant terminal.

Figure 21:
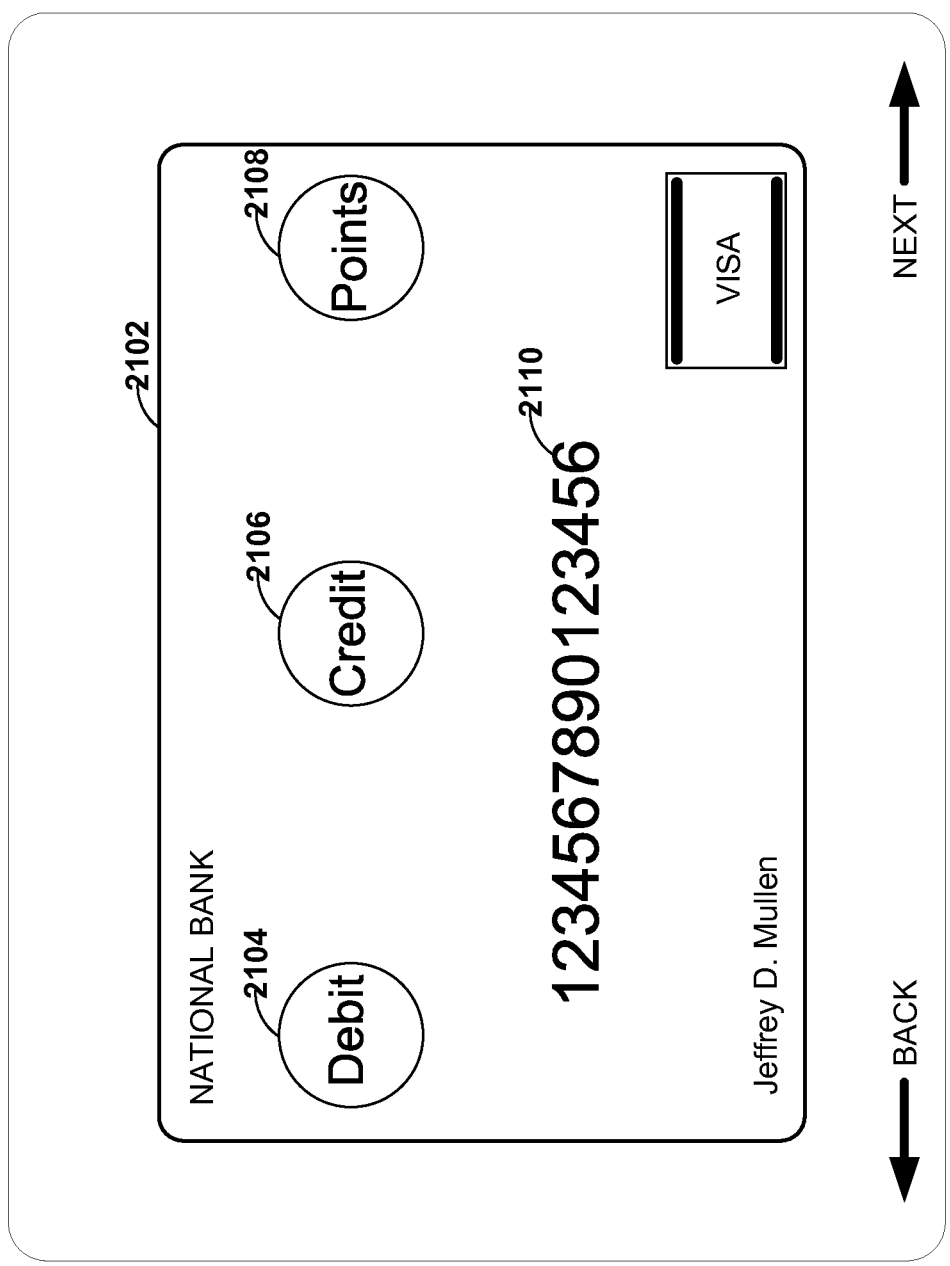
FIG. 21 is an illustration of a display screen constructed in accordance with the principles of the present invention.

FIG. 21 shows GUI 2100 that may be generated by a processor of a mobile device and provided onto a display of the mobile device. GUI 2100 may, for example, display virtual card 2102 that may employ all of the features of its physical counterpart. For example, a powered card (e.g., a powered payment card) may establish a contactless communication channel (e.g., an RFID communication channel) with a mobile device and communicate configuration and payment information that may be associated with the powered card. Accordingly, for example, a powered card may provide a manual interface (e.g., buttons) to allow a user to select a method of payment (e.g., credit, debit, or points) at the point of sale and may communicate such methods of payment to a mobile device. In so doing, for example, a mobile device may render virtual payment card 2102 having a virtual manual interface (e.g., virtual buttons 2104 through 2108), which a user may select (e.g., touch) in order to select a method of payment to be used by the mobile device when the mobile device communicates payment information to complete a purchase transaction.

A mobile device may, for example, establish a contactless communication channel (e.g., an RFID communication channel) with a merchant terminal to communicate payment information to the merchant terminal to complete a purchase transaction.

Accordingly, for example, a user may touch one of virtual buttons 2104-2108 just prior to placing the mobile device within a proximity to the merchant terminal. In so doing, for example, the mobile device may communicate one, two, and/or three tracks of magnetic stripe data to the merchant terminal and may include additional information (e.g., within a discretionary data field) to communicate a method of payment (e.g., credit, debit, or points) to the merchant terminal. Persons skilled in the art will appreciate that payment information may be communicated by a mobile device to a network entity (e.g., a payment server) via a wireless interface (e.g., a cellular interface) such that a method of payment (e.g., credit, debit, or points) may be communicated by the mobile device to the payment server to complete a remote purchase transaction.

FIG. 22 shows GUI 2200 that may be generated by a processor of a mobile device and provided onto a display of the mobile device. GUI 2200 may, for example, allow a user of a mobile device to break a payment up into multiple payment methods for a single purchase. For example, a user of a mobile device may have provided a mobile device within a proximity to a merchant terminal, such that the mobile device may have communicated a method of payment (e.g., credit) to the merchant terminal based upon a user selection made via a GUI displayed by the mobile device. A processor of the mobile device may, for example, recognize that a virtual card selected by the user for payment may offer additional payment methods (e.g., debit and points). Accordingly, for example, GUI 2200 may be rendered by a processor of the mobile device to allow the user of the mobile device the option to spread the payment across several accounts by entering amounts into alphanumeric entry boxes 2204-2208. In so doing, for example, a user may spread a purchase across multiple payment methods by entering an amount desired to be charged to each payment method (e.g., $5 credit, $5 debit, and 1500 points for a $25 total purchase). The mobile device may, for example, settle the transaction as three separate financial transactions by communicating payment information to one or more network entities (e.g., a payment server) that corresponds to each of the three financial transactions.

FIG. 23 shows GUI 2300 that may be generated by a processor of a mobile device and provided onto a display of the mobile device. GUI 2300 may, for example, communicate a credit offer to a user of a mobile device that may have been communicated to the mobile device via any one of a number of electronic means (e.g., text messaging, email, or internet browser pop-up). A credit offer may, for example, be extended to a user of a mobile device to add a payment card to the user's mobile device. A credit offer (e.g., credit offer 2306) may, for example, be extended to a user of a mobile device to replace a virtual card (e.g., virtual payment card 2304) that already exists within the user's mobile device. Accordingly, for example, network entities may examine virtual cards and related information that may be stored within a memory of a mobile device and attempt to sway the user of the mobile device to opt into another virtual card offer that may be better for the user (e.g., the new virtual card may offer a lower interest rate than a user's current virtual payment card).

GUI 2300 may, for example, provide credit offer options 2308 to a user of a mobile device. Accordingly, for example, a user may elect to accept a new credit offer and cancel a current virtual payment card with the same option. In so doing, for example, a mobile device may communicate with a network entity (e.g., an issuer of virtual payment card 2304) to cancel virtual payment card 2304 and may communicate with a network entity (e.g., an issuer for payment card offer 2306) to open the new payment account being offered.

Other options may be provided by GUI 2300. For example, a user may opt to accept the new credit offer, but keep virtual payment card 2304 as well. As per another example, a user may opt to accept the new credit offer, keep virtual payment card 2304, and transfer any balance that may be owing on virtual payment card 2304 to the new payment account now being offered.

Figure 24:
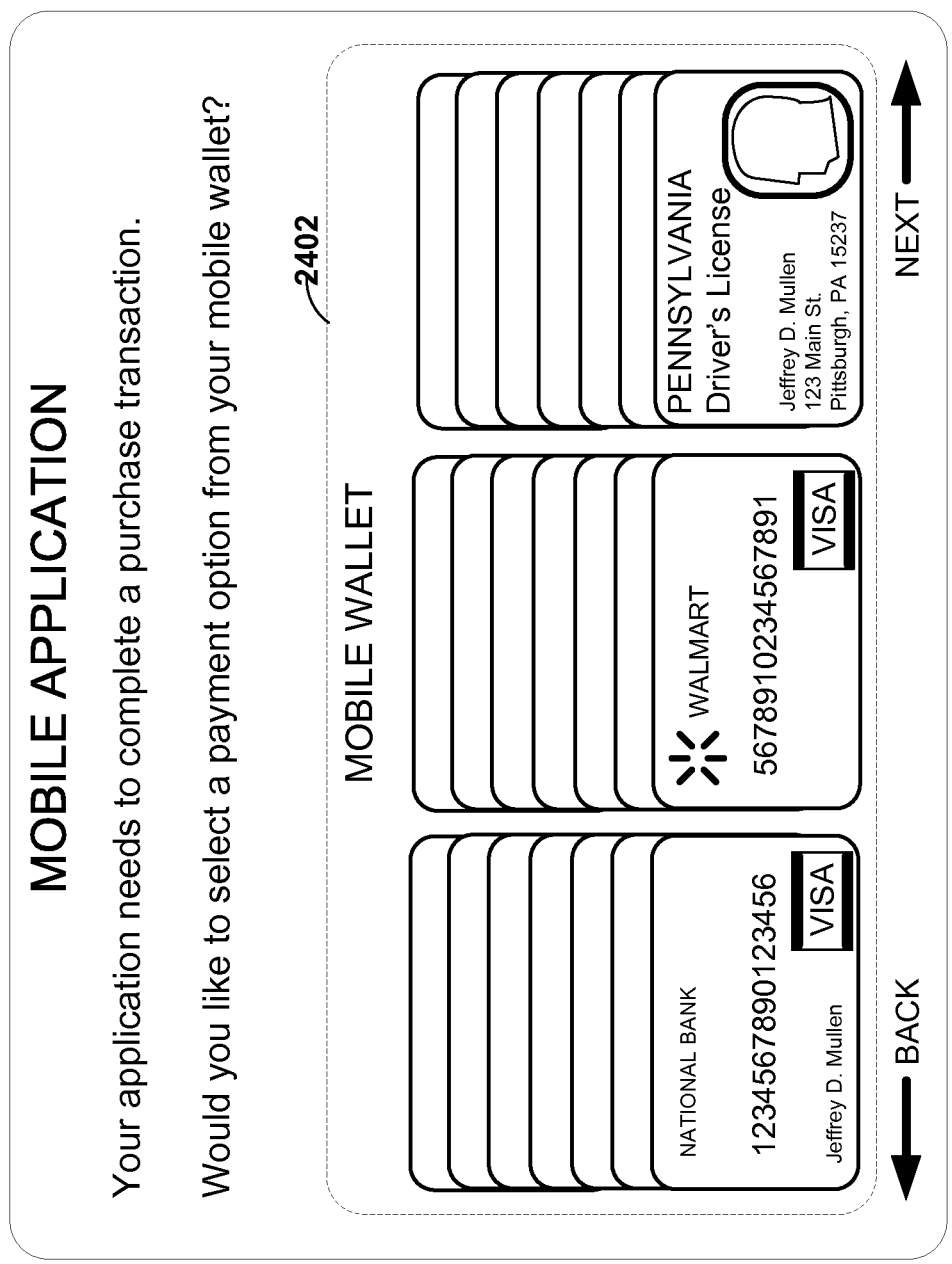
FIG. 24 is an illustration of a mobile application constructed in accordance with the principles of the present invention.

FIG. 24 shows mobile application 2400 that may be executed by a processor of a mobile device and provided onto a display of the mobile device. Application 2400 may, for example, be any executable application that may reside within a memory of a mobile device. For example, application 2400 may be an internet browsing application that may allow a user of a mobile device to browse online for goods and/or services and may allow the user to purchase such goods and/or services from application 2400. As per another example, mobile application 2400 may be a gaming activity that may require a purchase transaction to continue on to a next level of play or to obtain gaming features for purchase.

Application 2400 may, for example, provide access to mobile wallet 2402 which may be another application running on a mobile device. Accordingly, for example, when application 2400 requires payment for a particular function performed by application 2400 (e.g., a user wishes to purchase goods from an Amazon website), application 2400 may launch mobile wallet 2402 to allow a user to select a method of payment from mobile wallet 2402. A user may browse through each virtual card of mobile wallet 2402 by touching a virtual card to display the virtual card. Once a user has verified that a particular virtual card is the virtual card to be used to complete a purchase transaction, the user may touch the virtual card twice again to authorize a mobile device to complete a purchase transaction using payment information associated with the selected virtual card.

As per another example, a user may preselect payment options, such that mobile application 2400 need not launch mobile wallet 2402 to obtain a payment authorization. Instead, for example, a user may pre-authorize one virtual payment card within mobile wallet 2402 to be used by any other application running on a mobile device for purchase transactions. In so doing, for example, a user may pre-authorize payment information to be autonomously retrieved from mobile wallet 2402 without involving user interaction to authorize application 2400 for the purchase transaction.

Figure 25:
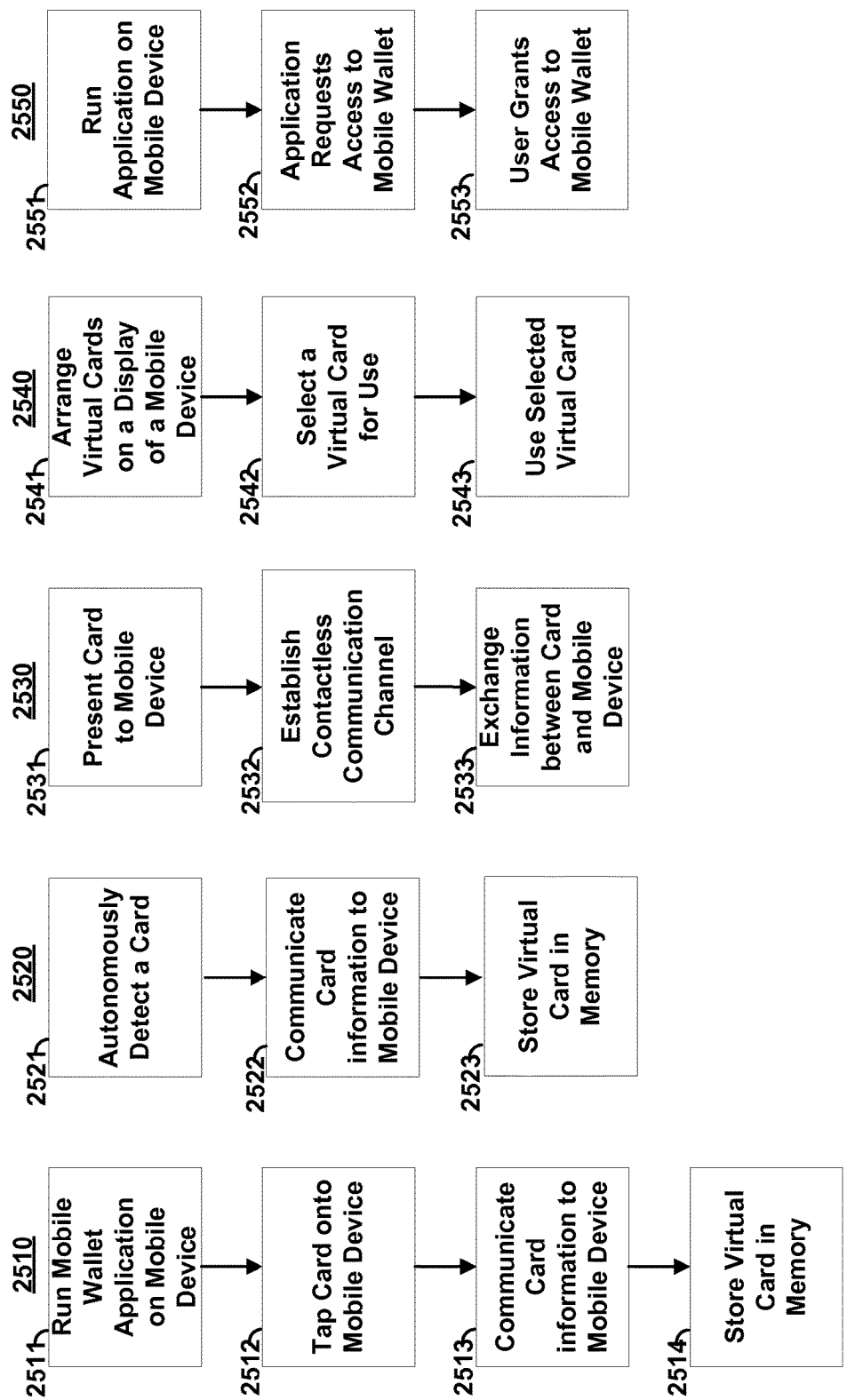
FIG. 25 is a flow chart of processes constructed in accordance with the principles of the present invention.

FIG. 25 shows flow charts for process sequences 2510-2550. Process sequence 2510 may, for example, execute a mobile wallet application on a mobile device (e.g., as in step 2511) to request a user of the mobile device to present a card to the mobile device. In step 2512, a user may present a card to a mobile device (e.g., tap a card onto a display of a mobile device). In step 2513, a contactless communication channel (e.g., an RF, capacitive, audible, visible, electromagnetic, or magnetic communication channel) may be generated between a card and a mobile device to communicate card information from the payment card to the mobile device. In step 2514, information may be stored within the mobile device or remote server (e.g., virtual cards may be generated, stored, and displayed by a GUI of the mobile device) for future use.

Process sequence 2520 may, for example, autonomously detect that a card is in a touching or a proximity relationship to a mobile device (e.g., as in step 2521). In step 2522, a contactless communication channel (e.g., an RF, capacitive, audible, visible, electromagnetic, or magnetic communication channel) may be generated between a card and a mobile device to communicate information from the card to the mobile device. In step 2523, information associated with each physical card presented to the mobile device may be stored within the mobile device for future use.

Step 2531 of sequence 2630 may include presenting a card to a mobile device. A card may, for example, be a powered card or a non-powered card. In steps 2532 and 2533, a contactless communication channel may be established between a card and a mobile device and information may be exchanged between the card and the mobile device.

A card may, for example, include a near-field communication device (e.g., an RFID) that may communicate with a contactless communication device of a mobile device to form a two-way communication channel between the card and the mobile device. A card may, for example, include circuitry to simulate touch (e.g., a capacitance change) in order to form a contactless communication channel with a mobile device.

Accordingly, for example, a card may be pressed against a touch-sensitive display of a mobile device and information may be communicated by the card to the mobile device through a series of card-simulated touches that may be detected by the touch-sensitive display of the mobile device.

A card may, for example, include a light sensor to form a contactless communication channel with a mobile device. Accordingly, for example, a card may be pressed against a display of a mobile device and information may be communicated from the mobile device to the card through a series of light pulses generated by the display of the mobile device. A frequency, pulse width, and/or a pulse intensity of light pulses may, for example, be detected by a processor of a card as data communicated by a mobile device.

A card may, for example, include a light source (e.g., an LED) to form a contactless communication channel. Accordingly, for example, a card may emit varying light pulses from an LED that may be detected by a motion-capture device (e.g., a camera) of a mobile device as data communicated by the card. A card may, for example, include sound emission capabilities that may be detected by a microphone of a mobile device as data communicated by the card through a contactless communication channel. A mobile device may, for example, include sound emission capabilities that may be detected by a microphone of a card as data communicated by the mobile device through a contactless communication channel.

Step 2541 of sequence 2540 may include arranging information contained within a memory of a mobile device and/or a remote server and rendering the information on a display of a mobile device. The rendered information may, for example, be virtual cards that are representative of physical card counterparts previously presented to the mobile device for upload.

The virtual cards may, for example, be arranged according to category (e.g., payment cards, gift cards and identification cards). Within each category, virtual cards may be sorted according to any sort preference. For example, payment cards may be sorted in an order of most frequently used to least frequently used, in order of most available credit to least available credit, or in order of highest credit limit to lowest credit limit. Other cards (e.g., merchant gift cards) may be sorted in accordance with a user's location. For example, a mobile device may determine a location of its user and may sort virtual cards in response to the determined location (e.g., a virtual Walmart gift card may be displayed at the top of a gift card list based upon a user's location within a Walmart store).

Virtual cards displayed by a GUI of a mobile device may, for example, be selected for use (e.g., as in step 2542). A user may, for example, touch a virtual card among several virtual cards displayed by a mobile device to view information related to the touched virtual card. If desired for use, the touched virtual card may be touched twice again and activated for use (e.g., as in step 2543). An activated virtual card may, for example, be used to complete a purchase transaction via the mobile device. An activated virtual card may, for example, be deleted from a memory of the mobile device. Documents associated with an activated virtual card, such as purchase transaction receipts and bank statements, may be viewed from a display of a mobile device. Virtual cards that may be associated with an activated virtual card may be viewed from a display of a mobile device and activated themselves to perform other functions (e.g., an activated virtual payment card may be associated with a virtual rewards card, where the virtual rewards card may be activated to obtain and view the total number of rewards points that may be associated with the virtual rewards card).

Step 2551 of sequence 2550 may include running an application on a mobile device. Such an application may be any executable application that may require purchase transactions to be completed while the application executes. As per one example, a user booking airline tickets using his or her mobile device may select their itinerary and may book their itinerary through a purchase transaction conducted by the mobile device. Accordingly, for example, the mobile application may request access to a mobile wallet application also running on the mobile device (e.g., as in step 2552), a user may grant access to the mobile wallet application (e.g., as in step 2553) by selecting a virtual payment card from within the mobile wallet and may authorize a purchase transaction to be conducted by the mobile application using the authorized virtual payment card. As per another example, a mobile application may autonomously request access to a mobile wallet application (e.g., as in step 2552) that has been pre-authorized by a user of the mobile device (e.g., as in step 2553) such that the mobile application may autonomously conduct the purchase transaction without any further involvement with the user.

Persons skilled in the art will appreciate that the present invention is not limited to only the embodiments described. Instead, the present invention more generally involves dynamic information and the exchange thereof. Persons skilled in the art will also appreciate that the apparatus of the present invention may be implemented in other ways than those described herein. All such modifications are within the scope of the present invention, which is limited only by the claims that follow.

What is claimed is:

1. A method, comprising:
receiving, by a mobile device, information communicated from one or more physical powered cards using at least one contactless communication channel, wherein said at least one contactless communication channel is established between said mobile device and said one or more physical powered cards;
creating at least a part of a mobile wallet of virtual cards within a memory of said mobile device based on said received information; and
using, by said mobile device, payment information associated with at least one of said virtual cards in a purchase transaction.

2. The method of claim 1, wherein said mobile device is a laptop.

3. The method of claim 1, wherein said mobile device is a PDA.

4. The method of claim 1, wherein said mobile device is a phone.

5. The method of claim 1, wherein said mobile device is an MP3 device.

6. The method of claim 1, wherein said mobile device is a GPS device.

7. The method of claim 1, wherein said contactless communication channel is an RFID communication channel.

8. The method of claim 1, further comprising:
establishing said contactless communication channel between said one or more physical powered cards and said mobile device by bringing said mobile device and said one or more physical powered cards within a proximity distance of up to two inches.

9. The method of claim 1, further comprising:
receiving, by a display of said mobile device, a series of simulated touches from said one or more physical powered cards to establish at least a portion of said contactless communication channel.

10. The method of claim 1, further comprising:
communicating, by said mobile device, an optical data stream to said one or more physical powered cards to establish at least a portion of said contactless communication channel.

11. The method of claim 1, further comprising:
validating at least one PIN associated with said one or more physical powered cards, said PIN used to authorize use of said received information by said mobile device.

12. The method of claim 1, wherein said received information is based on manual input entered into said one or more physical powered cards.

13. The method of claim 1, wherein said received information includes said payment information, and said payment information includes card information associated with a payment account selected by pressing a button of said one or more physical powered cards.

14. The method of claim 1, wherein said virtual cards include gift cards.

15. The method of claim 1, further comprising:
displaying a graphical user interface operable to modify a visual appearance of said virtual cards as displayed by said mobile device.

16. The method of claim 1, further comprising:
creating a visual appearance of said virtual cards as displayed by said mobile device based on said received information.

17. The method of claim 1, further comprising:
sorting said virtual cards onto a display of said mobile device based on manual input selection received by a graphical user interface of said mobile device.

18. The method of claim 1, further comprising:
receiving a selection of said at least one of said virtual cards,
wherein said using payment information includes completing said purchase transaction via a second contactless communication channel established between said mobile device and a merchant terminal by communicating said payment information associated with said selected virtual card to said merchant terminal via said second contactless communication channel.

* * * * *